US012724507B2

(12) United States Patent
Cho et al.

(10) Patent No.: US 12,724,507 B2
(45) Date of Patent: Sep. 1, 2026

(54) ELECTRONIC DEVICE AND METHOD FOR RECOGNIZING INPUT TO FLEXIBLE DISPLAY

(71) Applicant: Samsung Electronics Co., Ltd., Suwon-si (KR)

(72) Inventors: Hyunje Cho, Suwon-si (KR); Seungmin Bae, Suwon-si (KR); Jeongseob Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/275,464

(22) Filed: Jul. 21, 2025

(65) Prior Publication Data

US 2025/0348166 A1 Nov. 13, 2025

Related U.S. Application Data

(63) Continuation of application No. PCT/KR2023/019435, filed on Nov. 29, 2023.

(30) Foreign Application Priority Data

Jan. 26, 2023 (KR) ........................ 10-2023-0010454
Feb. 22, 2023 (KR) ........................ 10-2023-0023775

(51) Int. Cl.
*G06F 3/041* (2006.01)
*G06F 1/16* (2006.01)

(52) U.S. Cl.
CPC .......... *G06F 3/0416* (2013.01); *G06F 1/1652* (2013.01); *G06F 2203/04101* (2013.01); *G06F 2203/04102* (2013.01)

(58) Field of Classification Search
None
See application file for complete search history.

(56) References Cited

U.S. PATENT DOCUMENTS 9,170,678 B2 10/2015 Cho et al.
10,921,854 B2 2/2021 Garelli et al.
(Continued)

FOREIGN PATENT DOCUMENTS

EP 3 764 206 A1 1/2021
JP 2015-141596 A 8/2015
(Continued)

OTHER PUBLICATIONS

International Search Report with English translation and Written Opinion dated Mar. 18, 2024; International Appln. No. PCT/KR2023/019435.

(Continued)

*Primary Examiner* — Nicholas J Lee
(74) *Attorney, Agent, or Firm* — Jefferson IP Law, LLP

(57) ABSTRACT

An electronic device and a method performed by the electronic device are provided. The method includes identifying, by the electronic device, an input with respect to a flexible display of the electronic device based on an external object, in response to the input having a first contact point on a first area of the flexible display corresponding to a first housing, recognizing, by the electronic device, the input as a touch input with respect to a first position on the first area corresponding to a position of the first contact point, in response to the input having a second contact point on a third area between the first area and a second area of the flexible display corresponding to a second housing, recognizing, by the electronic device, the input as a touch input with respect to a second position on the third area identified based on a position of the second contact point of the external object and a position of a hovering input caused by the external object, and providing, by the electronic device, a response with respect to the touch input, wherein the flexible display (Continued)

includes a hinge structure rotatably coupling the second housing to the first housing.

20 Claims, 17 Drawing Sheets

(56) References Cited

U.S. PATENT DOCUMENTS

| | | | | |
|---|---|---|---|---|
| 10,942,546 | B2 | 3/2021 | Park et al. | |
| 11,079,867 | B2 | 8/2021 | Jiang et al. | |
| 11,392,247 | B2 | 7/2022 | Kim et al. | |
| 2014/0198036 | A1 | 7/2014 | Kim et al. | |
| 2015/0293620 | A1 | 10/2015 | Cho | |
| 2016/0334936 | A1 | 11/2016 | Obata | |
| 2017/0102738 | A1* | 4/2017 | Park | G06F 3/04883 |
| 2024/0118763 | A1 | 4/2024 | Kim et al. | |

FOREIGN PATENT DOCUMENTS

| | | | |
|---|---|---|---|
| KR | 10-2014-0092059 | A | 7/2014 |
| KR | 10-1414097 | B1 | 8/2014 |
| KR | 10-2017-0043076 | A | 4/2017 |
| KR | 10-2018-0073730 | A | 7/2018 |
| KR | 10-2131825 | B1 | 7/2020 |
| KR | 10-2224478 | B1 | 3/2021 |
| KR | 10-2379635 | B1 | 3/2022 |
| KR | 10-2022-0138221 | A | 10/2022 |
| KR | 10-2022-0167583 | A | 12/2022 |
| KR | 10-2650857 | B1 | 3/2024 |

OTHER PUBLICATIONS

European Search Report dated Apr. 7, 2026, issued in European Application No. 23918759.4.

* cited by examiner

200

205 {205-1, 205-2, 205-3, 205-4}

ELECTRONIC DEVICE AND METHOD FOR RECOGNIZING INPUT TO FLEXIBLE DISPLAY

CROSS-REFERENCE TO RELATED APPLICATION(S)

This application is a continuation application, claiming priority under 35 U.S.C. § 365(c), of an International application No. PCT/KR2023/019435, filed Nov. 29, 2023, which is based on and claims the benefit of a Korean patent application number 10-2023-0010454, filed on Jan. 26, 2023, in the Korean Intellectual Property Office, and of a Korean patent application number 10-2023-0023775, filed on Feb. 22, 2023, in the Korean Intellectual Property Office, the disclosure of each of which is incorporated by reference herein in its entirety.

BACKGROUND

1. Field

The disclosure relates to an electronic device and a method for identifying an input with respect to a flexible display.

2. Description of Related Art

Recently, a distribution of various types of portable electronic devices such as a smartphone, a tablet personal computer (PC), a wireless earphone, a smart watch, and a laptop has been expanding. Some of the electronic devices may include a deformable flexible display. An electronic device including the flexible display may provide, through the flexible display, a folding state (e.g., a fully folding), an unfolding state (e.g., a fully unfolding), and an intermediate state between the folding state and the unfolding state. The electronic device may provide various user interfaces (UIs) to a user in the intermediate state.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for identifying an input with respect to a flexible display.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing, a hinge structure rotatably coupling the second housing to the first housing, a flexible display disposed on a surface of the first housing and a surface of the second housing across the hinge structure, wherein the flexible display includes a first area corresponding to the first housing, a second area corresponding to the second housing, and a third area between the first area and the second area, memory, comprising one or more storage media, storing instructions, at least one sensor, and one or more processors communicatively coupled to the flexible display, the memory, and the at least one sensor, wherein the instructions, when executed by the one or more processors individually or collectively, cause the electronic device to identify an input with respect to the flexible display based on an external object, in response to the input having a first contact point on the first area, recognize the input as a touch input with respect to a first position on the first area corresponding to a position of the first contact point, in response to the input having a second contact point on the third area, recognize the input as a touch input with respect to a second position on the third area identified based on a position of the second contact point and a position of a hovering input caused by the external object, and provide a response with respect to the touch input.

In accordance with another aspect of the disclosure, a method performed by an electronic device is provided. The method includes identifying, by the electronic device, an input with respect to a flexible display of the electronic device based on an external object, in response to the input having a first contact point on a first area of the flexible display corresponding to a first housing, recognizing, by the electronic device, the input as a touch input with respect to a first position on the first area corresponding to a position of the first contact point, in response to the input having a second contact point on a third area between the first area and a second area of the flexible display corresponding to a second housing, recognizing, by the electronic device, the input as a touch input with respect to a second position on the third area identified based on a position of the second contact point of the external object and a position of a hovering input caused by the external object, and providing, by the electronic device, a response with respect to the touch input, wherein the flexible display includes a hinge structure rotatably coupling the second housing to the first housing.

In accordance with another aspect of the disclosure, an electronic device is provided. The electronic device includes a first housing, a second housing, a hinge structure rotatably coupling the second housing to the first housing, a flexible display disposed on a surface of the first housing and a surface of the second housing across the hinge structure, wherein the flexible display includes a first area corresponding to the first housing, a second area corresponding to the second housing, and a third area between the first area and the second area, memory, comprising one or more storage media, storing instructions; at least one sensor, and one or more processors communicatively coupled to the flexible display, the memory, and the at least one sensor, wherein the instructions, when executed by the one or more processors individually or collectively, cause the electronic device to: identify the third area based on an angle between the first area and the second area, in response to an external object moving from the first area toward the second area across over the third area, identify a movement of the external object on the first area as a first drag input and identify a movement of the external object on the third area as a second drag input, based on a first set of contact points on the first area according to the first drag input, recognize a touch input having a first length on the first area, based on a second set of contact points on the third area according to the second drag input and hovering inputs caused by the external object on the third area, recognize a touch input having a second length on the third area, and provide a response with respect to the touch input having the first length and the touch input having the second length.

In accordance with another aspect of the disclosure, one or more non-transitory computer-readable storage media storing one or more computer programs including computer-executable instructions that, when executed by one or more processors of an electronic device individually or collectively, cause the electronic device to perform operations, are provided. The operations include identifying, by the electronic device, an input with respect to a flexible display of the electronic device based on an external object, in response to the input having a first contact point on a first area of the flexible display corresponding to a first housing, recognizing, by the electronic device, the input as a touch input with respect to a first position on the first area corresponding to a position of the first contact point, in response to the input having a second contact point on a third area between the first area and a second area of the flexible display corresponding to a second housing, recognizing, by the electronic device, the input as a touch input with respect to a second position on the third area identified based on a position of the second contact point of the external object and a position of a hovering input caused by the external object, and providing, by the electronic device, a response with respect to the touch input, wherein the flexible display includes a hinge structure rotatably coupling the second housing to the first housing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
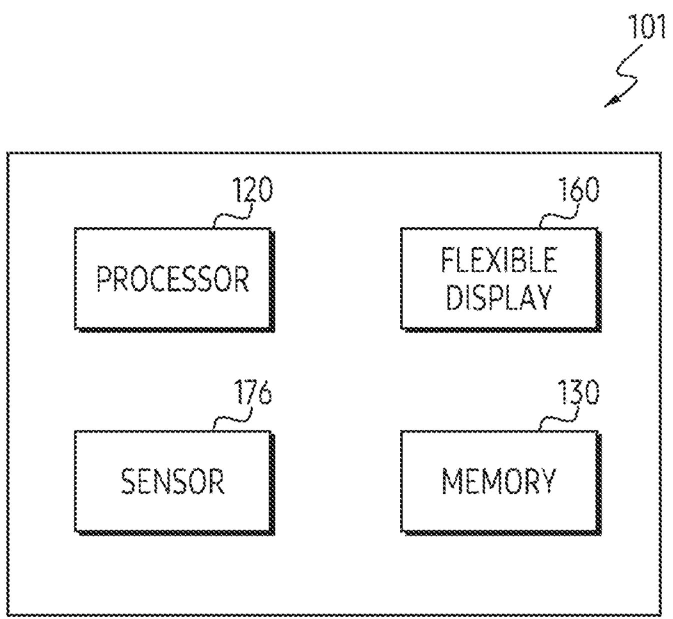
FIG. 1 illustrates an example of a block diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein, including a technical or a scientific term, may have the same meaning as those generally understood by a person with ordinary skill in the art described in the disclosure. Among the terms used in the disclosure, terms defined in a general dictionary may be interpreted as identical or similar meaning to the contextual meaning of the relevant technology and are not interpreted as ideal or excessively formal meaning unless explicitly defined in the disclosure. In some cases, even terms defined in the disclosure may not be interpreted to exclude embodiments of the disclosure.

In various embodiments of the disclosure described below, a hardware approach will be described as an example. However, since the various embodiments of the disclosure include technology that uses both hardware and software, the various embodiments of the disclosure do not exclude a software-based approach.

In the following description, a term referring to a configuration of a device (e.g., a processor, a display, a module, and the like), a term for a computational state (e.g., an operation, and a procedure), a term referring to a signal (e.g., data, signal, information, and the like), and a term referring to data (e.g., a parameter, value, and the like) are exemplified for convenience of explanation. Therefore, the disclosure is not limited to the terms described below, and other terms having the same technical meaning may be used.

In addition, in the disclosure, the term 'greater than' or 'less than' may be used to determine whether a particular condition is satisfied or fulfilled, but this is only a description to express an example and does not exclude description of 'greater than or equal to' or 'less than or equal to'. A condition described as 'greater than or equal to' may be replaced with 'greater than', a condition described as 'less than or equal to' may be replaced with 'less than', and a condition described as 'greater than or equal to and less than' may be replaced with 'greater than and less than or equal to'. In addition, hereinafter, 'A' to 'B' refers to at least one of elements from A (including A) to B (including B).

Hereinafter, in an electronic device including a flexible display, a device and a method of identifying an input with respect to an electronic device in a folding state are proposed. Specifically, a flexible display folded at a certain angle may include a specific area in which it is difficult to identify an input by an external object. For example, the specific area may include an area of the flexible display corresponding to a hinge portion of the electronic device. Hereinafter, the specific area may be referred to as a touch difficulty area.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a wireless fidelity (Wi-Fi) chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates an example of a block diagram of an electronic device according to an embodiment of the disclosure.

Referring to FIG. 1, an electronic device 101 may include a processor 120, a display 160, a sensor 176, and memory 130. For example, the processor 120, the flexible display 160, the sensor 176, and the memory 130 of the electronic device 101 may be electronically and/or operably coupled with each other by an electronical component such as a communication bus. A type and/or the number of hardware components included in the electronic device 101 is not limited to as illustrated in FIG. 1. For example, the electronic device 101 may include only a portion of the hardware components illustrated in FIG. 1.

According to an embodiment, the processor 120 of the electronic device 101 may include a hardware component for processing data based on one or more instructions. The hardware component for processing data may include, for example, an arithmetic and logic unit (ALU), a field programmable gate array (FPGA), and/or a central processing unit (CPU). The number of the processors 120 may be one or more. For example, the processor 120 may have a structure of a multi-core processor such as a dual core, a quad core, or a hexa core. The processor 120 may include at least one processor.

According to an embodiment, the memory 130 of the electronic device 101 may include a hardware component for storing data and/or instructions inputted to and/or outputted from the processor 120. For example, the memory 130 may include volatile memory such as random-access memory (RAM), and/or non-volatile memory such as read-only memory (ROM). For example, the volatile memory may include at least one of dynamic RAM (DRAM), static RAM (SRAM), Cache RAM, and pseudo SRAM (PSRAM). For example, the non-volatile memory may include at least one of programmable ROM (PROM), erasable PROM (EPROM), electrically erasable PROM (EEPROM), flash memory, a hard disk, a compact disk, and an embedded multimedia card (eMMC).

According to an embodiment, one or more instructions indicating an operation to be performed on data by the processor 120 may be stored in the memory 130 of the electronic device 101. A set of instructions may be referred to as firmware, an operating system, a process, a routine, a sub-routine and/or an application. For example, the electronic device 101 and/or the processor 120 of the electronic device 101 may perform at least one of operations of FIGS. 5, 6A to 6C, 7A, 7B, 8A, 8B, 9A, and 9B by executing a set of a plurality of instructions distributed in a form of an application.

Figure 2A:
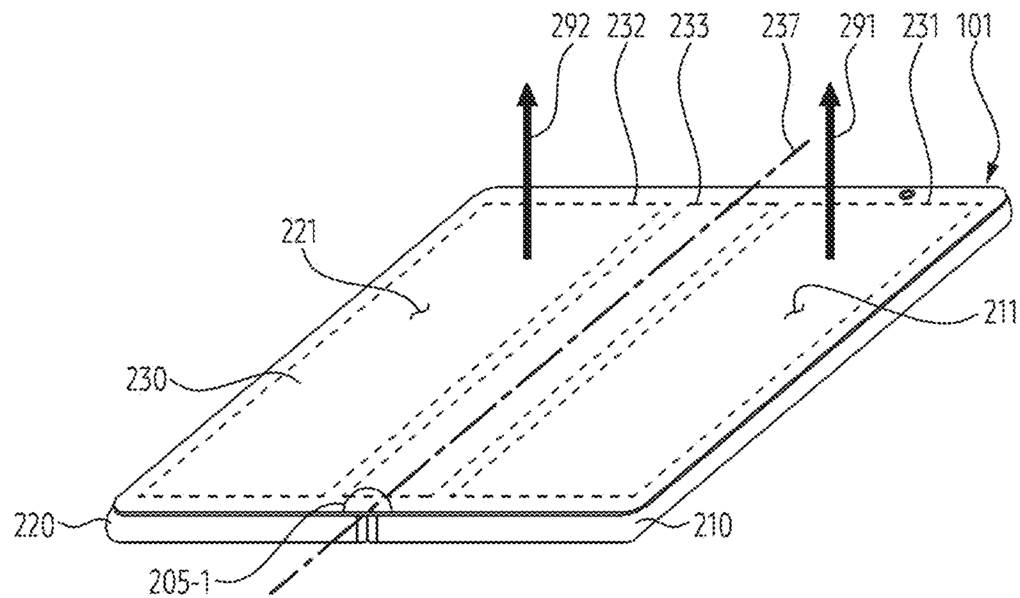
FIGS. 2A and 2B illustrate an example of a positional relationship between a first housing and a second housing in an unfolding state and a folding state of an electronic device according to various embodiments of the disclosure.
Figure 2B:
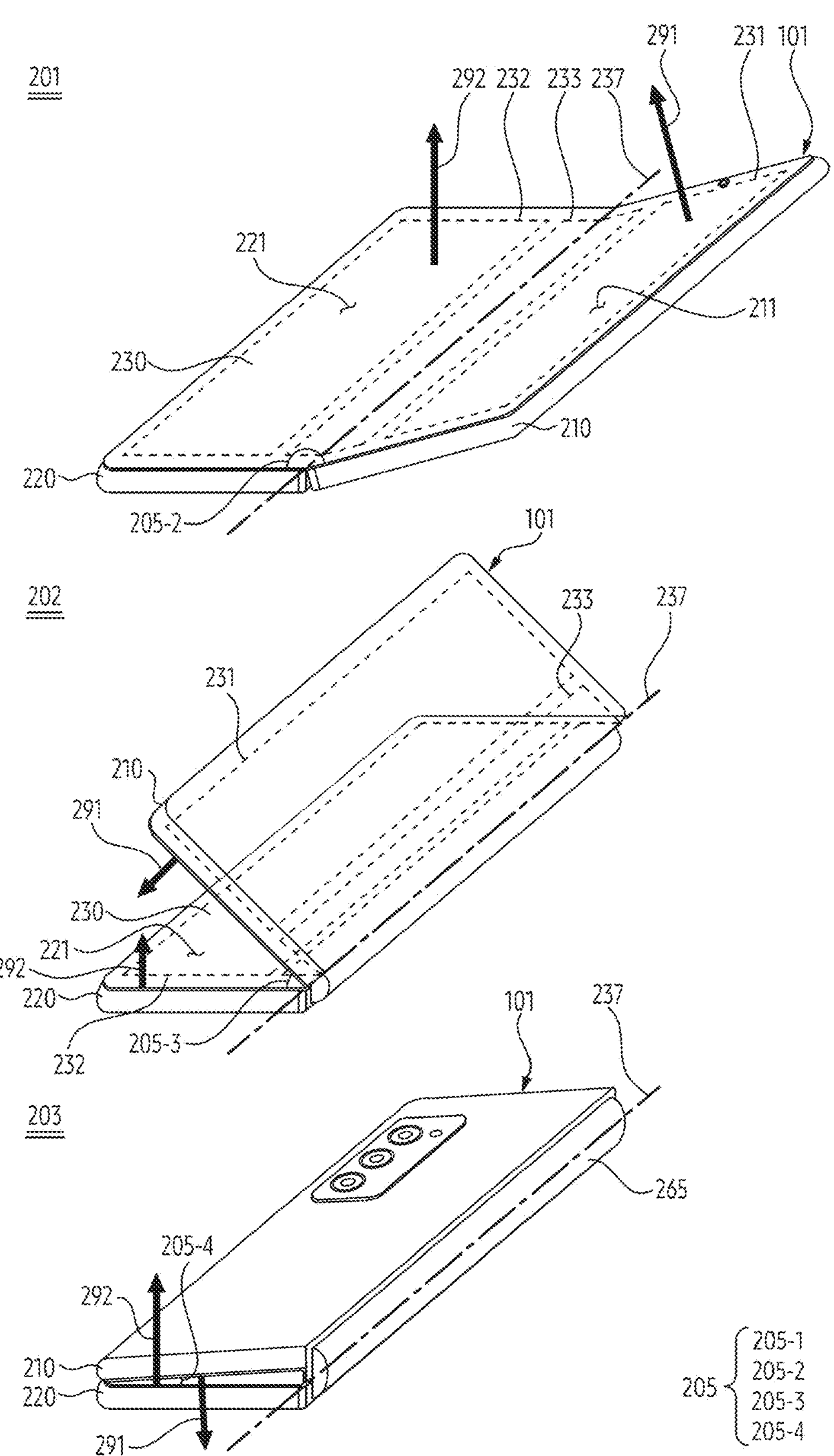

According to an embodiment, the flexible display 160 may output visualized information to a user by being controlled by a controller such as the processor 120. The flexible display 160 may include a flat panel display (FPD) and/or electronic paper. The FPD may include a liquid crystal display (LCD), a plasma display panel (PDP), and/or one or more light emitting diodes (LEDs). The LED may include an organic LED (OLED). In FIGS. 2A and 2B, a positional relationship of a first housing and a second housing of the electronic device 101 including the deformable flexible display 160 is described. For example, the flexible display 160 may be used to display a screen obtained by the processor 120 or a screen obtained by display driving circuitry. For example, the electronic device 101 may display the screen on one portion of the flexible display 160 according to the control of the display driving circuitry. For example, the electronic device 101 may display the screen on the one portion based on an angle at which the flexible display 160 is bent. However, it is not limited thereto. For example, the electronic device 101 may display the screen through an entire display area of the flexible display 160 regardless of the angle at which the flexible display 160 is bent. The angle may be referred to as a folding degree.

According to an embodiment, the flexible display 160 may include at least one of a cover panel (C-panel) for protecting the flexible display 160, a base substrate, a thin film transistors (TFT) layer formed on the base substrate, a pixel layer (or an organic light emitting layer) including pixels that emit light based on a voltage applied from the thin film transistors layer, or a polarizing layer disposed on the pixel layer. For example, the substrate may be formed of a plurality of layers. The polarizing layer may improve sharpness of an image displayed through the flexible display 160 by imparting directionality to light emitted from a portion (e.g., a pixel layer) of the flexible display 160. For example, the flexible display 160 may further include a window disposed above the polarizing layer. For example, the flexible display 160 may not include the polarizing layer. For example, in a case that the flexible display 160 does not include the polarizing layer, the flexible display 160 may further include a color filter layer for enhancing color purity and a black matrix (BM) layer for preventing reflection of light, on the thin film encapsulation layer, in order to enhance visibility. For example, the flexible display 160 may further include the color filter layer and a black pixel define layer (PDL). For example, the electronic device 101 may display a screen in one portion of the flexible display 160. For example, the screen may cause at least one image on a window disposed in a portion different from the one portion, based on an angle between the first housing and the second housing of the electronic device 101. The image may be an example of a reflected image of the screen based on the window.

According to an embodiment, the flexible display 160 of the electronic device 101 may include a sensor (e.g., a touch sensor panel (TSP)) for detecting an external object (e.g., a user's finger) on the flexible display 160. For example, based on the TSP, the electronic device 101 may detect an external object that is in contact with the flexible display 160 or floating on the flexible display 160. In response to detecting the external object, the electronic device 101 may execute a function related to a specific visual object (e.g., a screen) corresponding to a position of the external object on the flexible display 160 among visual objects displayed in the flexible display 160. For example, the electronic device 101 may recognize an input including a contact point corresponding to a first point of the flexible display 160 as an input corresponding to a second point different from the first point. Related details are described below in FIGS. 6A to 6C, 7A, and 7B.

According to an embodiment, the sensor 176 of the electronic device 101 may generate electronic information that may be processed by the processor 120 and/or the memory 130 from non-electronic information related to the electronic device 101. The electronic information generated by the sensor 176 may be stored in the memory 130, processed by the processor 120, and/or transmitted to another electronic device distinguished from the electronic device 101. An embodiment of the electronic device 101 is not limited to a type and/or the number of one or more sensors illustrated in FIG. 1. For example, the sensor 176 may include a Global Positioning System (GPS) sensor for detecting a geographic location of the electronic device 101 and an illuminance sensor for measuring brightness of ambient light.

According to an embodiment, the sensor 176 of the electronic device 101 may detect a state (e.g., a folding state or an unfolding state) of the electronic device 101 or an external environmental state. The electronic device 101 may generate an electrical signal or data value corresponding to the detected state from the sensor 176. For example, the sensor 176 may include at least one of a Hall sensor, an acceleration sensor, and a gyro sensor.

For example, the Hall sensor may include one or more magnets and/or one or more magnetic sensors. At least one of the one or more magnets or the one or more magnetic sensors included in the Hall sensor may be disposed at different positions in the electronic device 101. A positional relationship of the one or more magnets and/or the one or more magnetic sensors in the electronic device 101 may be changed according to a shape of the electronic device 101. The electronic device 101 may measure the change in the positional relationship through the one or more magnetic sensors. The change in the positional relationship may cause a change in a magnetic field formed by the one or more magnets. The electronic device 101 may obtain a power signal indicating the change in the magnetic field using the Hall sensor. For example, the electronic device 101 may distinguish a posture or a state (e.g., the folding state or the unfolding state) using the power signal obtained from the Hall sensor. For example, the electronic device 101 may receive data indicating a state of the electronic device 101 from the Hall sensor. For example, the Hall sensor may output data indicating a shape of the flexible display 160. The shape of the flexible display 160 may be changed as it is folded or unfolded by a folding axis (e.g., a folding axis 237 of FIG. 2A). For example, the Hall sensor may output different data indicating the shape of the flexible display 160. For example, the electronic device 101 may identify an angle (e.g., the folding angle) between the first housing and the second housing of the electronic device 101 based on the different data. The electronic device 101 may display a screen in one portion of the flexible display 160 based on the identified angle. The electronic device 101 may identify a touch difficulty area of the flexible display 160 based on the identified angle. Related details are described in detail below in FIGS. 9A and 9B.

According to an embodiment, the sensor 176 of the electronic device 101 may include the acceleration sensor for measuring a physical movement of the electronic device 101. For example, the acceleration sensor may output electronic information indicating a magnitude of gravitational acceleration measured on each of a plurality of designated axes (e.g., an x-axis, a y-axis, and a z-axis) perpendicular to each other. For example, the processor 120 of the electronic device 101 may measure a posture of the electronic device 101 in a physical space based on the electronic information outputted from the acceleration sensor. The posture measured by the electronic device 101 may indicate an orientation of the electronic device 101 measured by the acceleration sensor and/or a shape of the electronic device 101 (e.g., a shape of the electronic device 101 that is deformed by an external force, as will be described in FIGS. 2A and 2B). The electronic device 101 may determine a mode of the electronic device 101 based on the measured posture. The electronic device 101 may adjust a size or a position of a screen displayed in the flexible display 160 based on the determined mode. For example, the electronic device 101 may measure electronic information indicating the shape of the electronic device 101 by using another sensor (e.g., the Hall sensor) distinguished from the acceleration sensor. For example, the electronic device 101 may identify a portion on which at least one screen is displayed on the flexible display 160 based on the posture of the electronic device 101, using the acceleration sensor.

Referring to the above, the electronic device 101 may identify the angle between the first housing and the second housing of the electronic device 101, using the sensor 176. In the folding state, the electronic device 101 may identify areas of the flexible display 160. For example, the areas may include a touch difficulty area. The electronic device 101 may identify an input by an external object with respect to the touch difficulty area. The electronic device 101 may recognize a touch input with respect to the flexible display 160 based on a position of a contact point of the external object with respect to the flexible display 160 and a position of a hovering input caused by the external object. Accordingly, a device and a method according to an embodiment of the disclosure may accurately identify (or recognize) the input with respect to the touch difficulty area according to the folding state (e.g., the folding angle) of the electronic device 101. In addition, the device and the method according to an embodiment of the disclosure may seamlessly identify (or recognize) a drag input with respect to the area including the touch difficulty area according to the folding state of the electronic device 101. Hereinafter, the folding state or the unfolding state of the electronic device 101 is described in FIGS. 2A and 2B.

FIGS. 2A and 2B illustrate an example of a positional relationship between a first housing and a second housing in an unfolding state and a folding state of an electronic device according to various embodiments of the disclosure.

Referring to FIGS. 2A and 2B, an electronic device 101 may be understood as substantially the same as the electronic device 101 of FIG. 1. For example, a flexible display 230 may indicate an example of the flexible display 160 of FIG. 1. A first housing 210, a second housing 220, and a folding housing 265 may be included in the electronic device 101. At least a portion of the flexible display 230 may be disposed on a surface (e.g., a first surface 211) of the first housing 210 and a surface (e.g., a second surface 221) of the second housing. A first display area 231, a second display area 232, and a third display area 233 may be included in the flexible display 230. The folding housing 265 may be referred to as a hinge structure.

Referring to FIG. 2A, according to an embodiment, the electronic device 101 may provide an unfolding state in which the first housing 210 and the second housing 220 are fully folded out by the folding housing 265. For example, the electronic device 101 may be in a state 200 which is the unfolding state. For example, the state 200 may mean a state in which an orientation 291 of the first housing 210, to which the first surface 211 is facing, corresponds to an orientation 292 of the second housing 220, to which the second surface 221 is facing. For example, in the state 200, the orientation 291 of the first housing 210 may be parallel to the orientation 292 of the second housing 220. For example, in the state 200, the orientation 291 of the first housing 210 may be the same as the orientation 292 of the second housing 220.

According to an embodiment, the first surface 211 may form substantially one plane with the second surface 221 in the state 200. For example, an angle 205-1 between the first surface 211 and the second surface 221 in the state 200 may be 180 degrees. For example, the state 200 may mean a state in which an entire display area of the flexible display 230 may be substantially provided on one plane. For example, the state 200 may mean a state in which the first display area 231, the second display area 232, and the third display area 233 may all be provided on one plane. For example, in the state 200, the third display area 233 may not include a curved surface. For example, the unfolding state may be referred to as an outspread state or an outspreading state. As an example, in the unfolding state, the electronic device 101 may display a screen by using the display areas 231, 232, and 233 of the flexible display 230 based on at least one application. In a state different from the unfolding state, the electronic device 101 may display a different screen related to the screen, on one of the first display area 231, the second display area 232, or the third display area 233. Hereinafter, a description with respect to the different state is described.

Referring to FIG. 2B, the electronic device 101 according to an embodiment may provide a folding state in which the first housing 210 and the second housing 220 are folded in by the folding housing 265. For example, the electronic device 101 may be in the folding state including a state 201, a state 202, and a state 203. For example, the folding state including the state 201, the state 202, and the state 203 may mean a state in which the orientation 291 of the first housing 210, to which the first surface 211 is facing, is distinguished from the orientation 292 of the second housing 220, to which the second surface 221 is facing. For example, the folding state may mean a state in which positions of the first housing 210 and the second housing 220 are deformed based on a folding axis 237. The electronic device 101 may identify the state using a sensor (e.g., the sensor 176 of FIG. 1). For example, in the state 201, an angle between the orientation 291 of the first housing 210 and the orientation 292 of the second housing 220 may be 45 degrees, and the orientation 291 of the first housing 210 and the orientation 292 of the second housing 220 may be distinguished from each other. For example, in the state 202, an angle between the orientation 291 of the first housing 210 and the orientation 292 of the second housing 220 may be 120 degrees, and the orientation 291 of the first housing 210 and the orientation 292 of the second housing 220 may be distinguished from each other. For example, in the state 203, an angle between the orientation 291 of the first housing 210 and the orientation 292 of the second housing 220 may be substantially 180 degrees, and the orientation 291 of the first housing 210 and the orientation 292 of the second housing 220 may be distinguished from each other.

According to an embodiment, an angle 205 between the first surface 211 and the second surface 221 in the folding state may be greater than or equal to 0 degrees and less than 180 degrees. For example, in the state 201, an angle 205-2 between the first surface 211 and the second surface 221 may be 135 degrees. In the state 202, an angle 205-3 between the first surface 211 and the second surface 221 may be 60 degrees. In the state 203, an angle 205-4 between the first surface 211 and the second surface 221 may be substantially 0 degrees. For example, the folding state may be referred to as a folded state.

According to an embodiment, unlike the unfolding state, the folding state may include a plurality of sub-folding states. For example, referring to FIG. 2B, the folding state may include the plurality of sub-folding states, including the state 203, which is a fully folding state in which the first surface 211 is substantially overlapped on the second surface 221 by rotation provided through the folding housing 265, and the state 201 and the state 202, which are intermediate folding states between the state 203 and the unfolding state (e.g., the state 200 of FIG. 2A). For example, the electronic device 101 may provide the state 203 in which an entire area of the first display area 231 is substantially fully overlapped on an entire area of the second display area 232 by the first surface 211 and the second surface 221 facing each other by the folding housing 265. For example, the electronic device 101 may provide the state 203 in which the orientation 291 of the first housing 210 is substantially opposite to the orientation 292 of the second housing 220. For example, the state 203 may mean a state in which the flexible display 230 is obscured in a field of view of a user looking at the electronic device 101. However, it is not limited thereto.

According to an embodiment, the flexible display 230 may be bent by the rotation provided through the folding housing 265. For example, in the flexible display 230, unlike the first display area 231 and the second display area 232, the third display area 233 may be bent according to a folding operation. For example, the third display area 233 may be in a curvedly bent state to prevent damage to the flexible display 230 in the fully folding state. In the fully folding state, unlike the third display area 233 being curvedly bent, the entire first display area 231 may be fully overlapped on the entire second display area 232.

According to an embodiment, in the state 200, the electronic device 101 may display the screen by using all of the first display area 231, the second display area 232, and the third display area 233 of the flexible display 230 based on one of a plurality of applications stored in memory (e.g., the memory 130 of FIG. 1). For example, the electronic device 101 may identify an angle (e.g., the angle 205-3) between the first housing 210 and the second housing 220 using a sensor (e.g., the sensor 176 of FIG. 1). The electronic device 101 may reduce and display the screen in one portion of the flexible display 230 based on the identified angle. While the screen is reduced and displayed in the one portion, the electronic device 101 may display another screen on another portion of the flexible display 230 different from the one portion, causing reflection of the screen displayed in the one portion. While the screen is reduced and displayed in the one portion, the electronic device 101 may match an upper end of the reduced screen to the folding axis 237 and display it.

Hereinafter, in FIGS. 3A and 3B, an example of identifying a posture (or an angle or a movement) of an electronic device by a sensor (e.g., the sensor 176 of FIG. 1) included in an electronic device 101 is described.

Figure 3A:
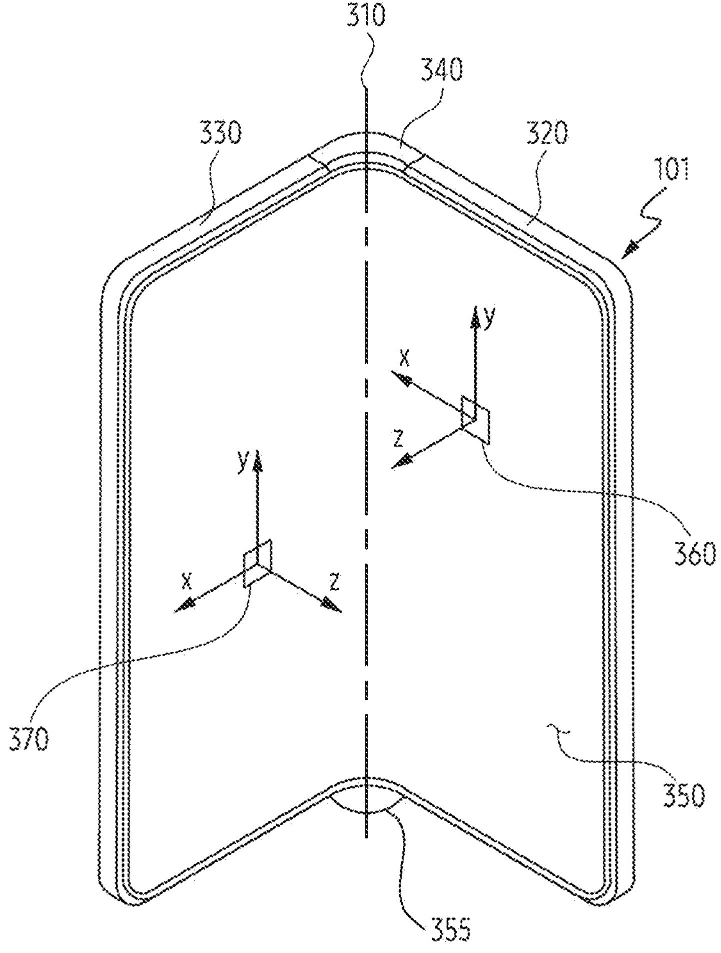
FIGS. 3A and 3B illustrate an example of a position of a plurality of acceleration sensors in an electronic device according to various embodiments of the disclosure.
Figure 3B:
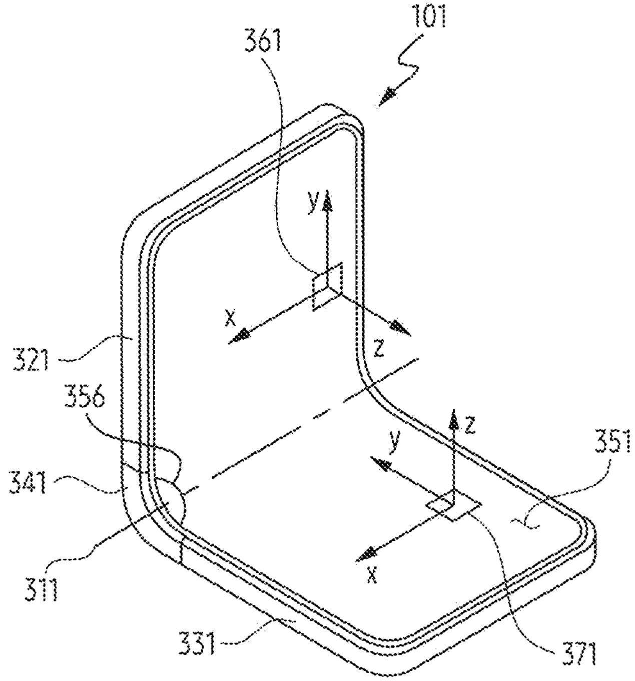

FIGS. 3A and 3B illustrate an example of a position of a plurality of acceleration sensors in an electronic device according to various embodiments of the disclosure. An electronic device 101 of FIG. 3A and an electronic device 101 of FIG. 3B may indicate an example of the electronic device 101 of FIG. 1 having different shapes.

Referring to FIGS. 3A and 3B, examples of an electronic device distinguished by a shape and/or structure of a housing are illustrated. For example, the electronic device 101 may include a housing (e.g., the first housing 210 of FIG. 2A, the second housing 220 of FIG. 2A, and the folding housing 265 of FIG. 2A) that is deformable based on at least one folding axis. Acceleration sensors 360, 361, 370, and 371 may be understood to be substantially the same as the acceleration sensor of FIG. 1. A first housing 320 or 321 may be understood to be substantially the same as the first housing 210 of FIG. 2A. A second housing 330 or 331 may be understood to be substantially the same as the second housing 220 of FIG. 2A. A folding housing 340 or 341 may be understood to be substantially the same as the folding housing 265 of FIG. 2A. Folding axes 310 and 311 may be understood to be substantially the same as the folding axis 237 of FIG. 2A. Flexible displays 350 and 351 may be understood to be substantially the same as the flexible display 160 of FIG. 1. An angle 355 or 356 may be understood to be substantially the same as the angles 205-1, 205-2, 205-3, and 205-4 of FIGS. 2A and 2B.

Referring to FIG. 3A, according to an embodiment, the deformable housing of the electronic device 101 may be distinguished by the folding housing 340 including the folding axis 310 and the first housing 320 and the second housing 330 connected to the folding housing 340. According to an embodiment, the flexible display 350 of the electronic device 101 may be an example of a display disposed across the first housing 320 and the second housing 330.

According to an embodiment, the electronic device 101 may include acceleration sensors 360 and 370 disposed in each of the first housing 320 and the second housing 330. The acceleration sensors 360 and 370 may be included in the electronic device 101 to measure a shape and/or a posture of the electronic device 101. Each of the acceleration sensors 360 and 370 may be included in a 6-axis motion sensor including an acceleration sensor based on three axes of a +x-axis, a +y-axis, and a +z-axis of FIG. 3A, and a gyro sensor based on the three axes. The acceleration sensors 360 and 370 may identify acceleration applied to each of the three axes. The acceleration may be a vector based on an orientation and/or a magnitude of net force applied to the electronic device 101. For example, the acceleration may be a vector indicating an amount of change in speed of the electronic device 101 due to the net force. The net force applied to the electronic device 101 may include a combination of gravity and another force (e.g., a force applied to the electronic device 101 by a user gripping the electronic device 101) distinct from the gravity. According to an embodiment, the acceleration sensors 360 and 370 of the electronic device 101 may identify rotation of the acceleration sensor based on the one or more axes. According to an embodiment, the electronic device 101 may identify a movement of the electronic device 101 based on the acceleration and/or the rotation identified by each of the acceleration sensors 360 and 370.

Using the acceleration sensors 360 and 370 according to an embodiment, the electronic device 101 may obtain an angle 355 between the first housing 320 and the second housing 330, and the folding axis 310. The electronic device 101 may identify a state (e.g., a folding state, an unfolding state, or a sub-unfolding state) of the electronic device 101 based on the angle 355. For example, referring to FIG. 3A, the electronic device 101 may identify the angle 355 between the first housing 320 and the second housing 330, using the acceleration sensors 360 and 370. For example, in a state in which the second housing 330 is fixed, the electronic device 101 may obtain values of the three axes of the +x-axis, the +y-axis, and the +z-axis of FIG. 3A, using the acceleration sensor 360 included in the first housing 320. For example, the electronic device 101 may identify a position of the first housing 320 or the angle 355 between the first housing 320 and the second housing 330, using the obtained values. For example, the electronic device 101 may identify the angle 355 included in a designated range. The designated range may be greater than or equal to 20 degrees and less than or equal to 60 degrees. For example, the electronic device 101 may display at least one screen in one portion of the flexible display 350 based on the identified angle 355. While displaying the at least one screen, the electronic device 101 may receive an input through a portion different from the one portion. According to at least one input by an external object, an example of the electronic device 101 recognizing the input is described below in FIGS. 4, 5, 6A to 6C, 7A, 7B, 8A, 8B, 9A, and 9B.

The electronic device 101 according to an embodiment may identify the movement of the electronic device 101, using the acceleration sensors 360 and 370, while displaying the at least one screen in one portion of the flexible display 350. For example, the electronic device 101 may identify an angle between the first housing 320 and the ground, or an angle between the second housing 330 and the ground, based on the identified movement. The electronic device 101 may identify at least one housing parallel to the ground among the first housing 320 or the second housing 330, based on the angles. As an example, the electronic device 101 may identify movement of the electronic device 101 while the electronic device 101 is displaying a screen in one portion of the flexible display disposed in the first housing 320. As an example, the electronic device 101 may identify the first housing 320 parallel to the ground based on the identified movement. The electronic device 101 may display the screen in a portion different from the portion disposed in the second housing 330 based on identifying the first housing 320 parallel to the ground. However, it is not limited to the above-described embodiment.

According to an embodiment, the shape of the electronic device 101 is not limited to the embodiment of FIG. 3A in which the folding axis 310 is formed parallel to a length, among a width and a length shorter than the width of the flexible display 350. Referring to FIG. 3B, an example of the electronic device 101, including the flexible display 351 having a width and a length longer than the width, and a folding axis 311 formed parallel to the width, is illustrated. A deformable housing of the electronic device 101 may include the folding housing 341 including the folding axis 311, and the first housing 321 and the second housing 331 distinguished by the folding axis 311. The electronic device 101 may include acceleration sensors 361 and 371 disposed in each of the first housing 321 and the second housing 331. The electronic device 101 may obtain an angle 356 between the first housing 321 and the second housing 331, and the folding axis 311 by using the acceleration sensors 361 and 371. The electronic device 101 may identify a state of the electronic device 101 based on the angle 356. The electronic device 101 may identify the angle 356 included in a designated range.

In an embodiment, the acceleration sensors 361 and 371 included in the electronic device 101 may be disposed on printed circuit boards (PCBs) included in each of the first housing 321 and the second housing 331. Among the PCBs, a PCB on which a processor (e.g., the processor 120 of FIG. 1) is disposed may be referred to as a main board. Among the PCBs, another PCB different from the PCB that is the main board may be referred to as a sub-board. Among the acceleration sensors 361 and 371, an acceleration sensor disposed on the main board may be referred to as a main acceleration sensor (e.g., a main 6-axis acceleration sensor), and the other acceleration sensor may be referred to as a sub-acceleration sensor (e.g., a sub-6-axis acceleration sensor).

According to an embodiment, the electronic device 101 may identify the movement of the electronic device 101, using the acceleration sensors 360, 361, 370, and 371. For example, the electronic device 101 may identify a curved angle of the flexible displays 350 and 351, using the acceleration sensors 360, 361, 370, and 371. For example, the electronic device 101 may identify one of the first housing 320 or 321 and/or the second housing 330 or 331, that is parallel to the ground, using a sensor different from the sensors. Based on the identified one, the electronic device 101 may display a screen in one portion of the flexible display included in a housing not parallel to the ground.

As described above, the electronic device 101 may identify the angle 355 or 356 included in a designated range related to an acute angle, using the acceleration sensors 360, 361, 370, and 371. The electronic device 101 may identify the first housing 320 or 321 and/or the second housing 330 or 331 that is parallel to the ground based on the identified angle 355 or 356. The electronic device 101 may display a screen in one portion of the flexible displays 350 and 351 included in the housing not parallel to the ground. While displaying the screen, the electronic device 101 may identify the movement of the electronic device 101, using the acceleration sensors 360, 361, 370, and 371 of the electronic device 101. The electronic device 101 may identify a housing parallel to the ground based on the identified movement. For example, in a case in which a housing including the one portion in which the screen is displayed is parallel to the ground, the electronic device 101 may replace and display the screen in a different portion of a housing different from the housing. The electronic device 101 may provide user convenience based on a characteristic of moving a screen using the acceleration sensors 360, 361, 370, and 371.

Figure 4:
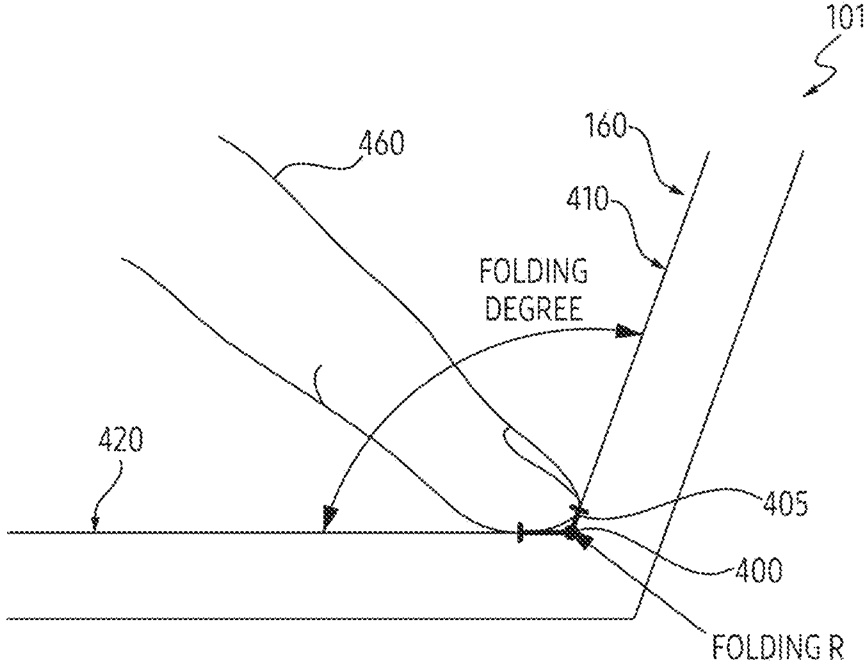
FIG. 4 illustrates an example of an input with respect to a flexible display in a folding state of an electronic device according to an embodiment of the disclosure.

FIG. 4 illustrates an example of an input with respect to a flexible display in a folding state of an electronic device according to an embodiment of the disclosure.

Referring to FIG. 4, an electronic device 101 illustrates an example of identifying an input by an external object 460 in a case where a flexible display 160 is in a folding state. For example, the electronic device 101 may be understood to be substantially the same as the electronic device 101 of FIGS. 1, 2A, 2B, 3A, and 3B.

Referring to FIG. 4, the electronic device 101 may be in a folding state. For example, the flexible display 160 may be bent based on an angle between a first housing corresponding to a first area 410 of the flexible display 160 and a second housing corresponding to a second area 420 of the flexible display 160, around a folding axis 400. For example, the first housing may be rotatably coupled to the second housing around the folding axis 400.

According to an embodiment, the electronic device 101 may identify an input with respect to a specific area 405 of the flexible display 160 differently from what was intended. For example, the electronic device 101 may identify the input with respect to the flexible display 160 by the external object 460. In this case, the electronic device 101 may recognize an input of the external object 460 with respect to the first area 410 and the second area 420 as substantially the same as what was intended. However, the electronic device 101 may recognize an input of the external object 460 with respect to the area 405 as substantially differently from what was intended. For example, a user of the electronic device 101 may want to input a portion of the folding axis 400 in the area 405 by the external object 460, but the input with respect to the folding axis 400 may be difficult according to the flexible display 160 in the folding state. In the example of FIG. 4, the electronic device 101 may identify both ends of the area 405 as an input rather than the input with respect to the folding axis 400. The area 405 may be referred to as a touch difficulty area.

According to an embodiment, the touch difficulty area may be identified based on at least one of a folding radius (R) with respect to the folding axis 400 of the electronic device 101, the angle around the folding axis 400, or a size of the external object 460. For example, the folding R may indicate a curvature or a radius of curvature with respect to the folding axis 400. The folding R may be identified based on a thickness of a housing of the electronic device 101. For example, the angle may indicate an angle between the first housing corresponding to the first area 410 and the second housing corresponding to the second area 420. For example, the size of the external object 460 may include a thickness of the external object 460 and a shape of the external object 460.

The electronic device 101 including the flexible display 160, such as a foldable laptop, may accurately identify a touch with respect to the area 405 in a case that the folding R is greater than or equal to a reference value. However, in a case that the folding R is less than the reference value, the electronic device 101 may find it difficult to identify an input that matches a portion to be inputted by the external object 460, with only an input including a contact point by the external object 460 and a hovering input caused by the external object 460. For example, in a case of a drag input with respect to areas including the area 405, the electronic device 101 may not recognize a portion of the drag input corresponding to the area 405.

As described above, with advancement in technology, in the electronic device 101 that becomes lighter and includes a thin housing, a touch difficulty area of the electronic device

101 may be expanded based on a relationship between the folding R and a thickness of the housing. Although hovering touch technology is used to more accurately identify an input with respect to the touch difficulty area, a device and a method for more accurately identifying the input with respect to the touch difficulty area are required.

Hereinafter, a device and a method according to an embodiment of the disclosure may identify (or recognize) an input with respect to the touch difficulty area based on an input including a contact point and a hovering input by an external object. The device and the method according to an embodiment of the disclosure may accurately identify an input with respect to a variable touch difficulty area according to a folding angle. In addition, even in a case of a drag input including the touch difficulty area, the device and the method according to an embodiment of the disclosure may accurately identify the drag input including the variable touch difficulty area according to the folding angle.

Figure 5:
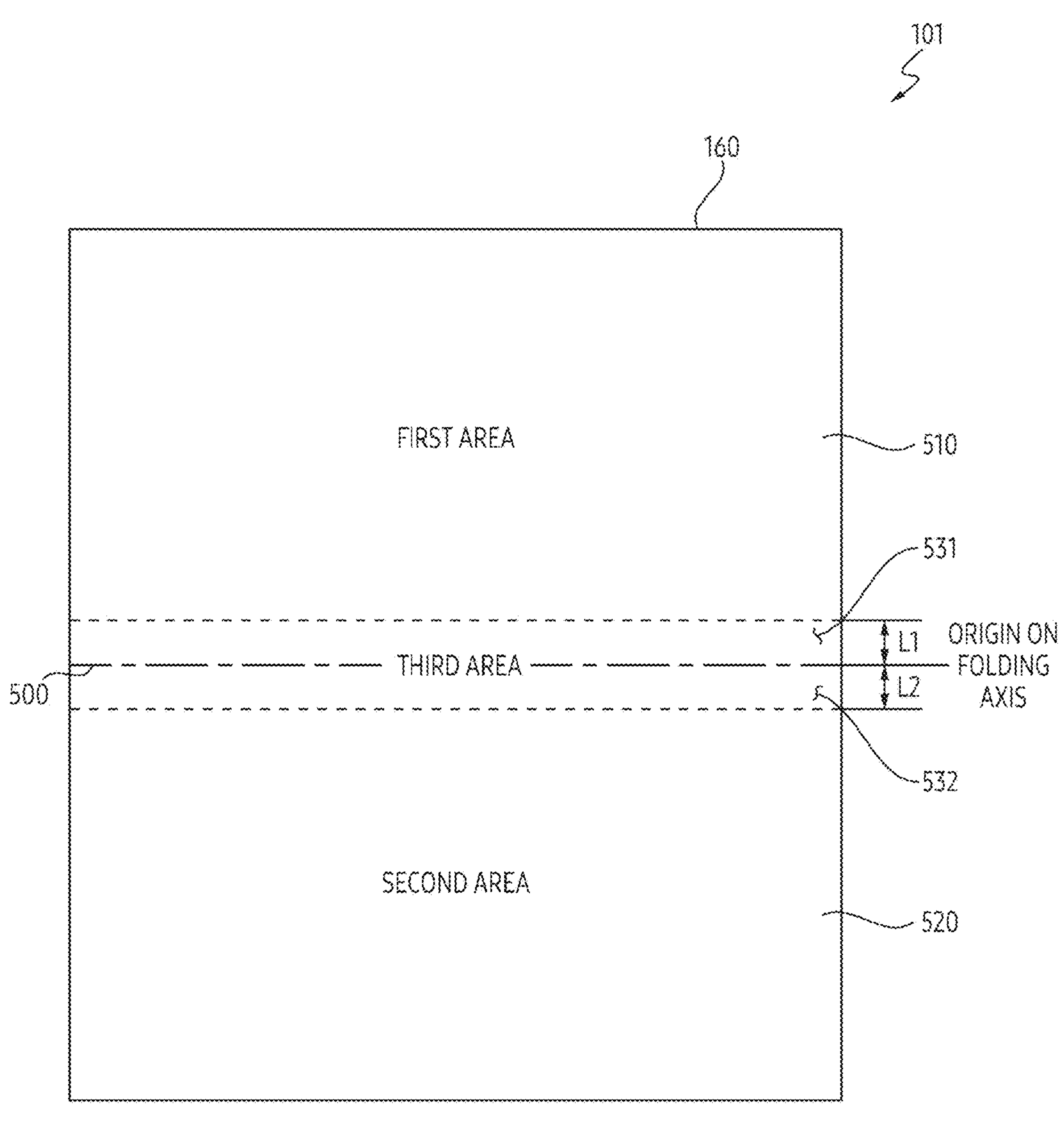
FIG. 5 illustrates an example with respect to areas of a flexible display of an electronic device according to an embodiment of the disclosure.

FIG. 5 illustrates an example with respect to areas of a flexible display of an electronic device according to an embodiment of the disclosure.

Referring to FIG. 5, an electronic device 101 may include a flexible display 160 that is foldable. For example, the flexible display 160 may be folded as a first housing (e.g., the first housing 210 of FIGS. 2A and 2B) rotates with respect to a second housing (e.g., the second housing 220 of FIGS. 2A and 2B) through a hinge structure (not illustrated) (e.g., the folding housing 265 of FIGS. 2A and 2B) of the electronic device 101.

According to an embodiment, the flexible display 160 may include a plurality of areas in a display area of the flexible display 160. For example, the flexible display 160 may include a first area 510 corresponding to the first housing, a second area 520 corresponding to the second housing, and a third area 530 between the first area 510 and the second area 520. For example, the first area 510 and the second area 520 may indicate a flat area in a state in which the flexible display 160 is folded. For example, the third area 530 may be referred to as an area of the flexible display 160 corresponding to the hinge structure. For example, the third area 530 may indicate a curved area in a state in which the flexible display 160 is folded.

According to an embodiment, the third area 530 of the flexible display 160 may include a plurality of partial areas. For example, the third area 530 may include a first partial area 531 corresponding to the first area 510 and a second partial area 532 corresponding to the second area 520. For example, the first partial area 531 may be positioned in an area close to the first area 510 around a folding axis 500 of the electronic device 101. The second partial area 532 may be positioned in an area close to the second area 520 around the folding axis 500 of the electronic device 101.

According to an embodiment, the electronic device 101 may identify the first partial area 531 and the second partial area 532 based on a folding angle of the flexible display 160, a distance indicating a height of a hovering input with respect to the flexible display 160 from the flexible display 160, or a reference distance indicating a maximum distance at which the flexible display 160 may identify the hovering input. Related details are described below in FIGS. 9A and 9B.

According to an embodiment, the electronic device 101 may identify at least one input with respect to the flexible display 160. For example, the electronic device 101 may identify an input including a contact point by an external object with respect to the flexible display 160. For example, the electronic device 101 may identify a hovering input by the external object with respect to the flexible display 160. The at least one input may include at least one of the input including the contact point and the hovering input. The input including the contact point and the hovering input may be referred to as an example of an input based on a touch.

According to an embodiment, the electronic device 101 may identify an input including a contact point and a hovering input based on a plurality of nodes in the flexible display 160 and thresholds for identifying an input. For example, the electronic device 101 may identify that values of first nodes among the plurality of nodes are changed based on an input including the contact point according to contact of the external object with respect to the first area 510. The values of the first nodes may indicate a change in a signal (e.g., voltage, quantity of light, resistance, or quantity of charge) with respect to the first nodes that have changed according to the contact of the external object. For example, the electronic device 101 may identify a position with respect to the input including the contact point by comparing the value of the first nodes with a first threshold value for identifying that it is an input including the contact point. In addition, the electronic device 101 may identify that values of second nodes among the plurality of nodes are changed based on a hovering input of the external object with respect to the first area 510. The values of the second nodes may represent a change in a signal (e.g., voltage, quantity of light, resistance, or quantity of charge) with respect to the second nodes that have changed according to the hovering input of the external object. For example, the electronic device 101 may identify a position with respect to the hovering input by comparing the value of the second nodes with a second threshold value for identifying that it is a hovering input. The second threshold value may be a value less than the first threshold value.

According to an embodiment, the electronic device 101 may identify a touch input based on the at least one input with respect to the flexible display 160. For example, the touch input may indicate an input corresponding to a position that the electronic device 101 identifies as being inputted from an external (or an external object) based on the at least one input. In other words, the touch input may indicate an input corresponding to an area on the flexible display 160 that a user of the electronic device 101 intends to input through an external object (e.g., a user's finger or a pen, and the like). For example, the electronic device 101 may identify a touch input based on an input including a contact point with respect to the first area 510 or an input including a contact point with respect to the second area 520. In this case, the touch input may correspond to the position of the contact point. For example, the electronic device 101 may identify a touch input based on an input including a contact point with respect to the first partial area 531 and a hovering input with respect to the second partial area 532 (or based on an input including a hovering input with respect to the first partial area 531 and an input including a contact point with respect to the second partial area 532). In this case, the touch input may be identified based on a position of the contact point and a position of the hovering input. Related details are described below in FIGS. 6A to 6C, 7A, and 7B.

Figure 6A:
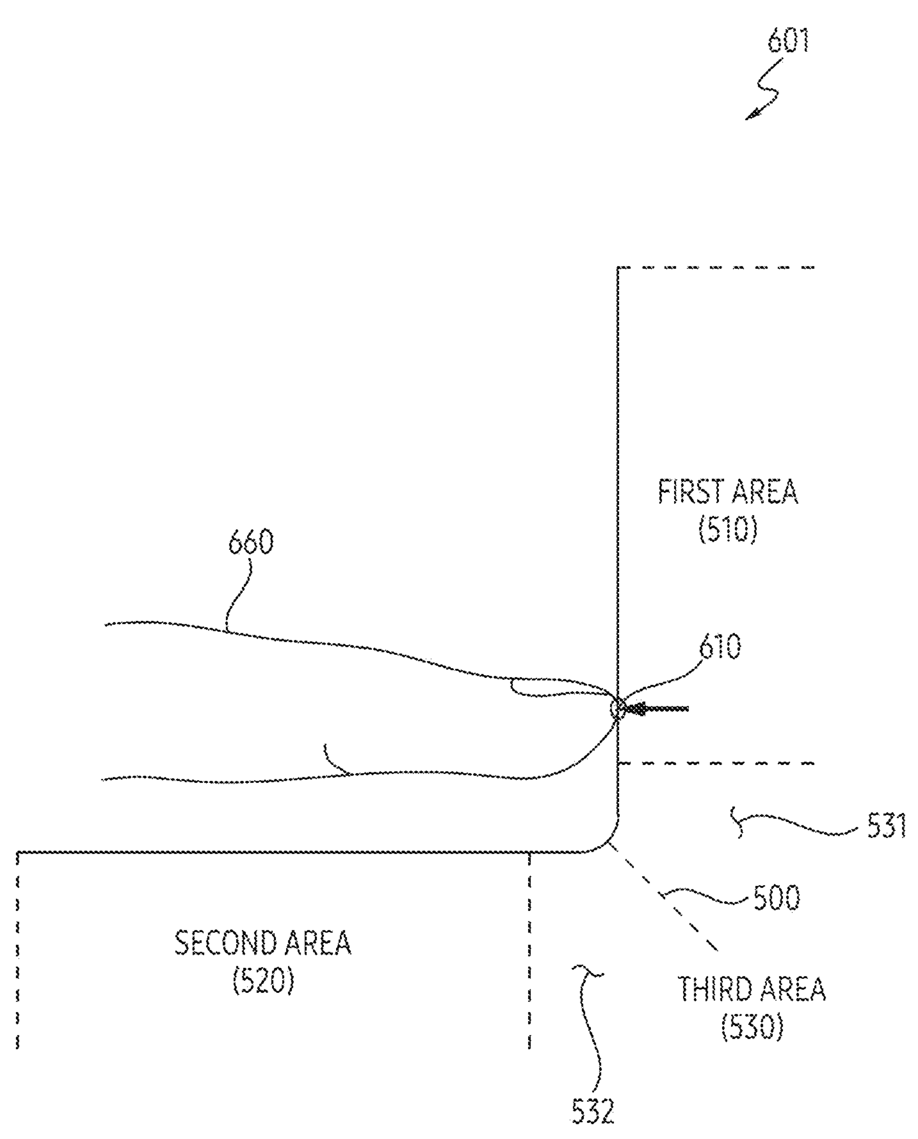
FIGS. 6A, 6B, and 6C illustrate examples with respect to a method of identifying an input according to an area of a flexible display according to various embodiments of the disclosure.
Figure 6B:
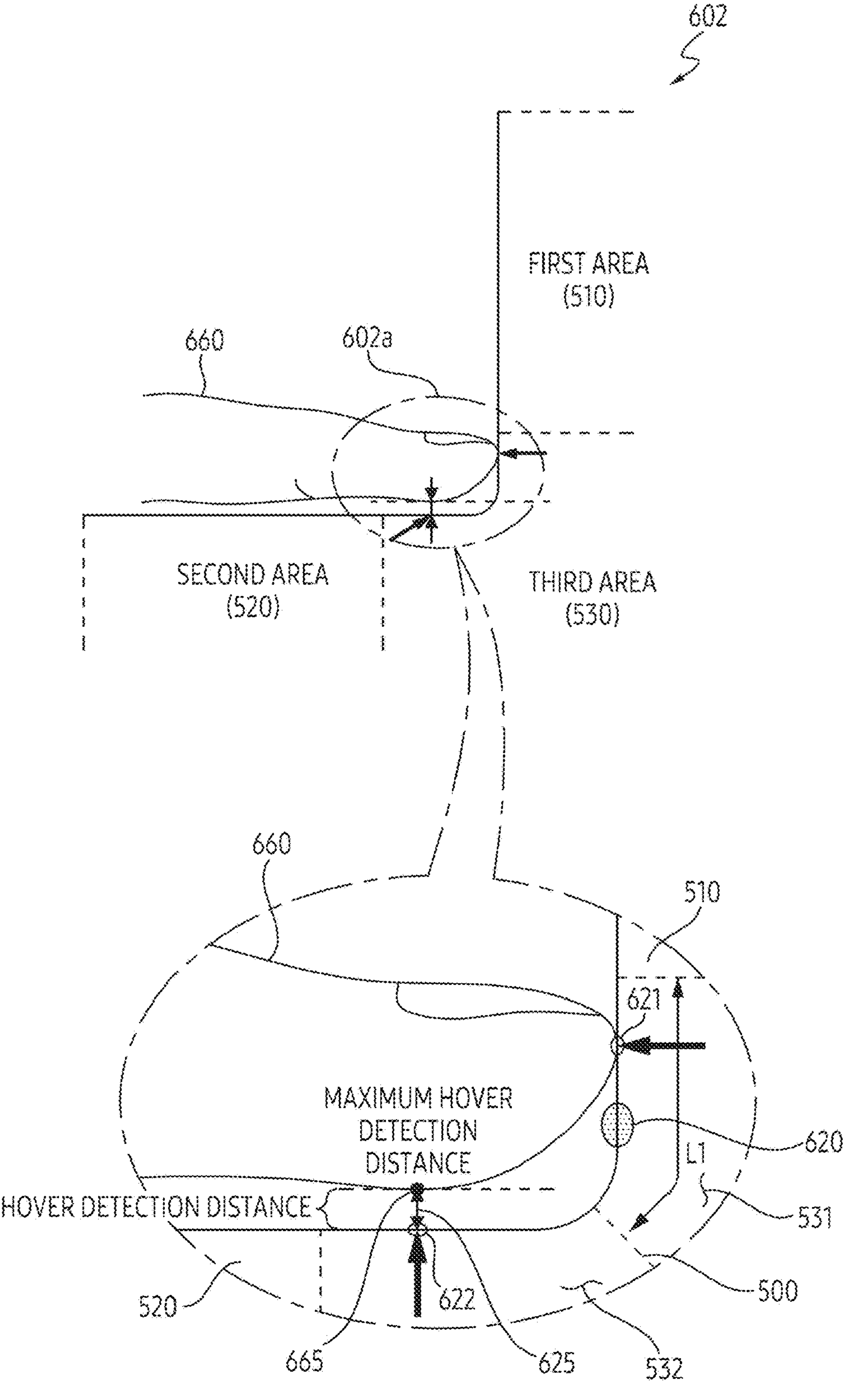
Figure 6C:
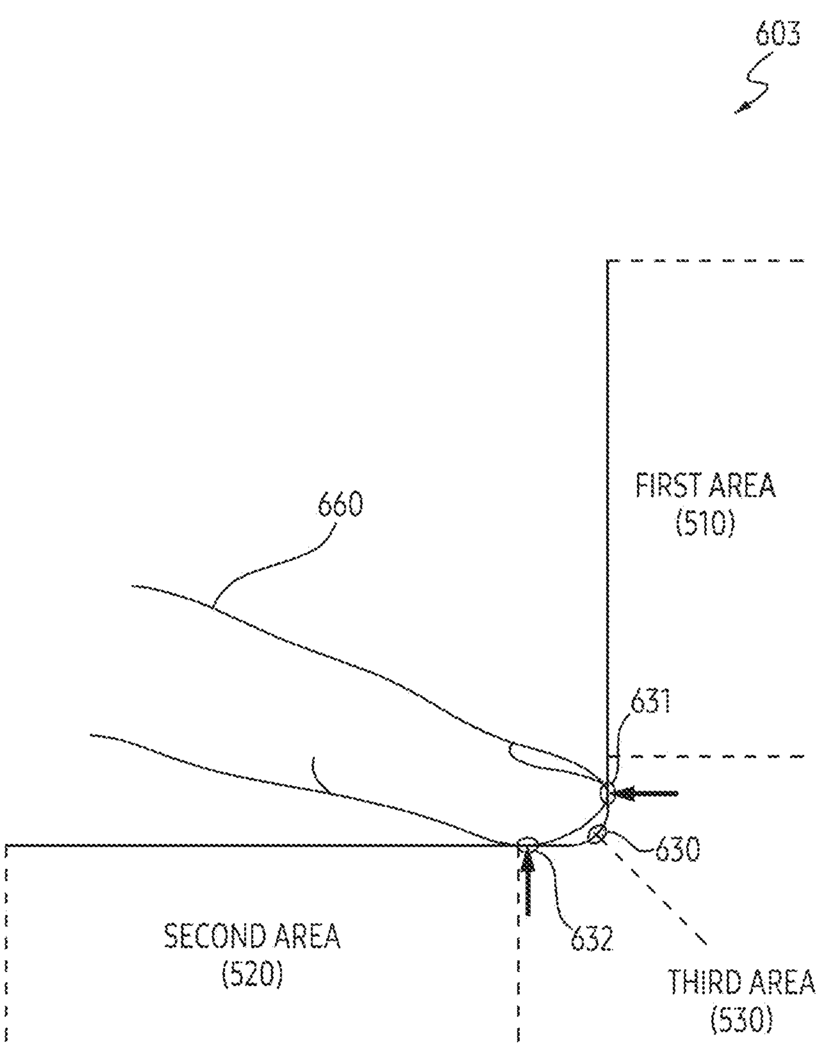

FIGS. 6A to 6C illustrate examples with respect to a method of identifying an input according to an area of a flexible display according to various embodiments of the disclosure.

An electronic device 101 of FIGS. 6A to 6C may be understood to be substantially the same as the electronic device 101 of FIG. 5. For example, a flexible display 160 of FIGS. 6A to 6C may be understood to be substantially the same as the flexible display 160 of FIG. 5. For example, a third area 530 may include a first partial area 531 corresponding to a first area 510 and a second partial area 532 corresponding to a second area 520 based on a folding axis 500.

FIGS. 6A to 6C illustrate examples 601, 602, and 603 in which the electronic device 101 identifies a touch input based on an input with respect to a plurality of areas of the flexible display 160. The input may include at least one of an input including a contact point by an external object or a hovering input by the external object. For example, the touch input may indicate an input corresponding to a position that the electronic device 101 identifies as being inputted from an external (or an external object) based on the at least one input.

FIG. 6A illustrates an example 601 of the electronic device 101 identifying an input by an external object 660 with respect to the first area 510. Referring to FIG. 6A, FIG. 6A illustrates an example of the electronic device 101 in a state in which the flexible display 160 is folded at a right angle (90°). However, the embodiment of the disclosure is not limited thereto. For example, the embodiment of the disclosure may also be applied to an electronic device 101 in a state in which the flexible display 160 is folded at an angle greater than or less than a right angle.

Referring to the example 601, the electronic device 101 may identify the input by the external object 660 with respect to the first area 510. For example, the electronic device 101 may identify an input 610 including a contact point with respect to the first area 510. According to an embodiment, the electronic device 101 may identify a position of the first area 510 corresponding to the input 610 including the contact point as the touch input. For example, the electronic device 101 may identify an input with respect to a position on the first area 510 that is substantially the same as a position of the contact point of the input 610 as the touch input.

According to an embodiment, a range in which the electronic device 101 may identify the position of the contact point of the input 610 and a position of the touch input as being the same on the first area 510 may be identified based on a reference distance, which is a maximum distance being capable of identifying a hovering input by the external object 660. For example, in a case that the electronic device 101 performs the input 610 in an area in which the hovering input is not identified by the external object 660 (e.g., in a case that the external object 660 performs the input 610 with respect to the first area 510 at a position higher than the reference distance), the position of the contact point and the position of the touch input of the first area 510 may be identified as the same. For example, the electronic device 101 may identify a position of an input including a contact point on the first area 510 by the external object 660 at the maximum distance being capable of identifying the hovering input (or a maximum hovering detection distance), to be the same as the position of the touch input.

Referring to the above, as the first area 510 is an area that is easy to touch regardless of a folding state of the flexible display 160, the electronic device 101 may identify the position on the first area 510 corresponding to the position of the input 610 including the contact point as the touch input.

FIG. 6B illustrates an example 602 of the electronic device 101 identifying an input by an external object 660 with respect to the third area 530. Referring to FIG. 6B, FIG. 6B illustrates an example of the electronic device 101 in a state in which the flexible display 160 is folded at a right angle (90°). However, the embodiment of the disclosure is not limited thereto. For example, the embodiment of the disclosure may also be applied to an electronic device 101 in a state in which the flexible display 160 is folded at an angle greater than or less than a right angle.

Referring to the example 602, the electronic device 101 may identify a plurality of inputs by the external object 660 with respect to the third area 530. For example, the electronic device 101 may identify an input 621 including a contact point with respect to the first partial area 531 of the third area 530. For example, the electronic device 101 may identify a hovering input 622 with respect to the second partial area 532 of the third area 530.

Referring to an example 602*a* indicating an enlarged input state of the example 602, the electronic device 101 may identify the input 621 including the contact point with respect to the first partial area 531 of the third area 530. The electronic device 101 may identify the hovering input 622 with respect to the second partial area 532 of the third area 530. According to an embodiment, the hovering input 622 may correspond to a portion 665 in which a distance 625 between the external object 660 and the second partial area 532 is the shortest distance. For example, the hovering input 622 may indicate a change in a signal (e.g., voltage, quantity of light, resistance, or quantity of charge) with respect to nodes that are changed by the portion 665.

According to an embodiment, the electronic device 101 may identify a touch input based on the input 621 including the contact point and the hovering input 622. For example, the electronic device 101 may identify the touch input based on the position of the contact point of the input 621, and a ratio between the distance 625 and the reference distance. For example, the electronic device 101 may identify the touch input corresponding to a position 620 in which the position of the contact point of the input 621 is corrected based on the ratio between the reference distance, which is the maximum distance being capable of identifying the hovering input 622, and the distance 625. For example, as the distance 625 becomes shorter (e.g., in a case that the external object 660 has a contact point in the first partial area 531 and has a hovering input with respect to the second partial area 532, approaches the second partial area 532), the position 620 may become closer to the folding axis 500.

Referring to the above, as the third area 530 is an area that is difficult to touch according to a folding state of the flexible display 160, the electronic device 101 may identify the position 620 on the third area 530 as the touch input based on the position of the input 621 including the contact point and the hovering input 622.

FIG. 6C illustrates an example 603 of the electronic device 101 identifying an input by an external object 660 with respect to the third area 530. Referring to FIG. 6C, FIG. 6C illustrates an example of the electronic device 101 in a state in which the flexible display 160 is folded at a right angle (90°). However, the embodiment of the disclosure is not limited thereto. For example, the embodiment of the disclosure may also be applied to an electronic device 101 in a state in which the flexible display 160 is folded at an angle greater than or less than a right angle.

Referring to the example 603, the electronic device 101 may identify the plurality of inputs by the external object 660 with respect to the third area 530. For example, the electronic device 101 may identify an input 631 including a contact point with respect to the first partial area 531 of the third area 530. For example, the electronic device 101 may identify an input 632 including a contact point with respect to the second partial area 532 of the third area 530.

Referring to the example 603, the electronic device 101 may identify the input 631 including the contact point with respect to the first partial area 531 of the third area 530. The electronic device 101 may identify the input 632 including the contact point with respect to the second partial area 532 of the third area 530. According to an embodiment, the electronic device 101 may identify a touch input based on the input 631 including the contact point and the input 632 including the contact point. For example, in a case of identifying the inputs 631 and 632 including the plurality of contact points in the third area 530, the electronic device 101 may identify the touch input with respect to a position 630 corresponding to the folding axis 500. In other words, the electronic device 101 may identify (or recognize) the input 631 including the contact point and the input 632 including the contact point as the touch input with respect to the position 630. The position 630 may be referred to as an origin of the folding axis 500 or a boundary between the first partial area 531 and the second partial area 532.

Referring to the above, as the third area 530 is the area that is difficult to touch according to a folding state of the flexible display 160, the electronic device 101 may identify the position 630 on the third area 530 as the touch input based on the position of the input 631 including the contact point and the position of the input 632 including the contact point.

Figure 7A:
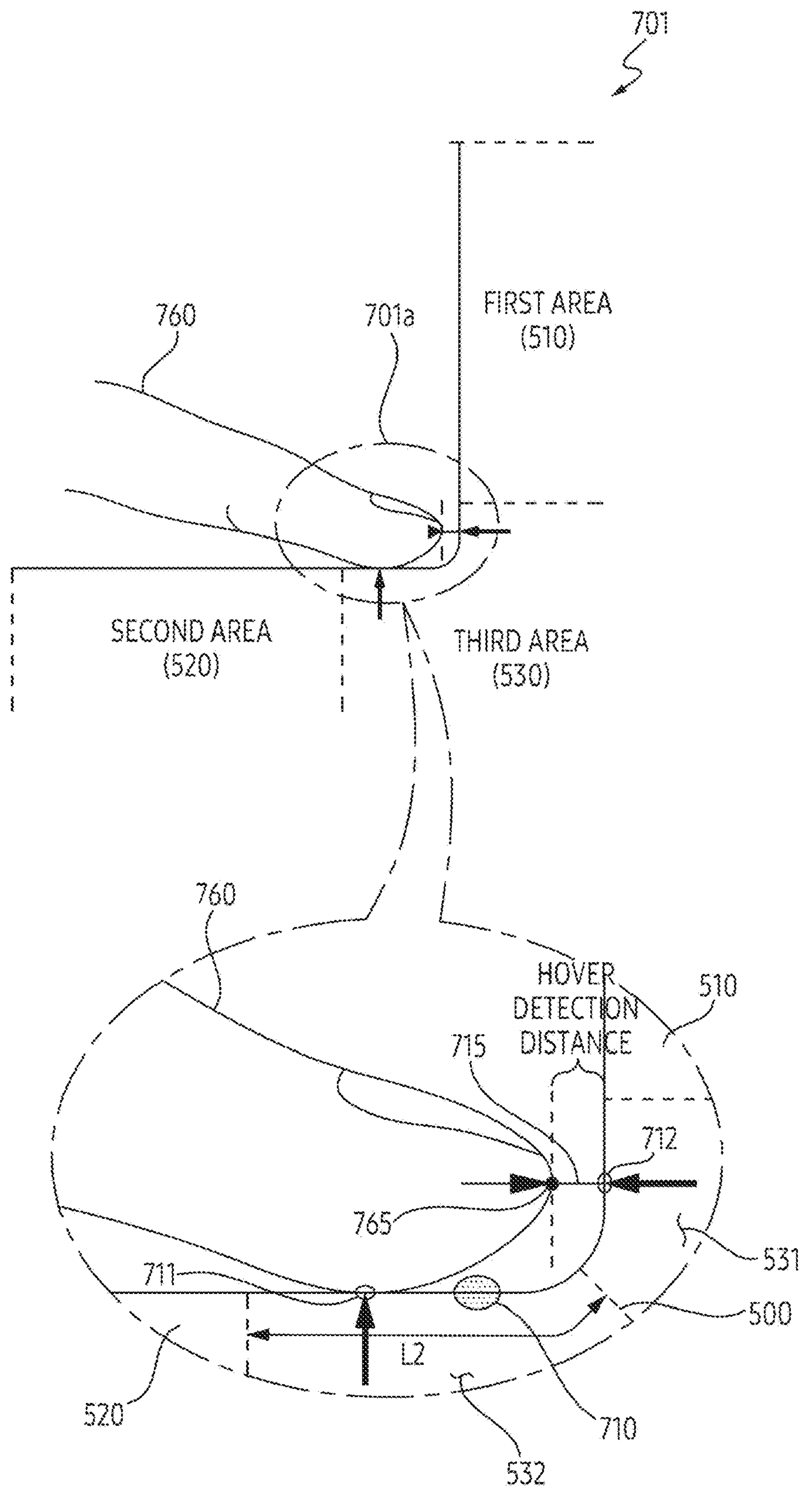
FIGS. 7A and 7B illustrate examples with respect to a method of identifying an input according to an area of a flexible display according to various embodiments of the disclosure.
Figure 7B:
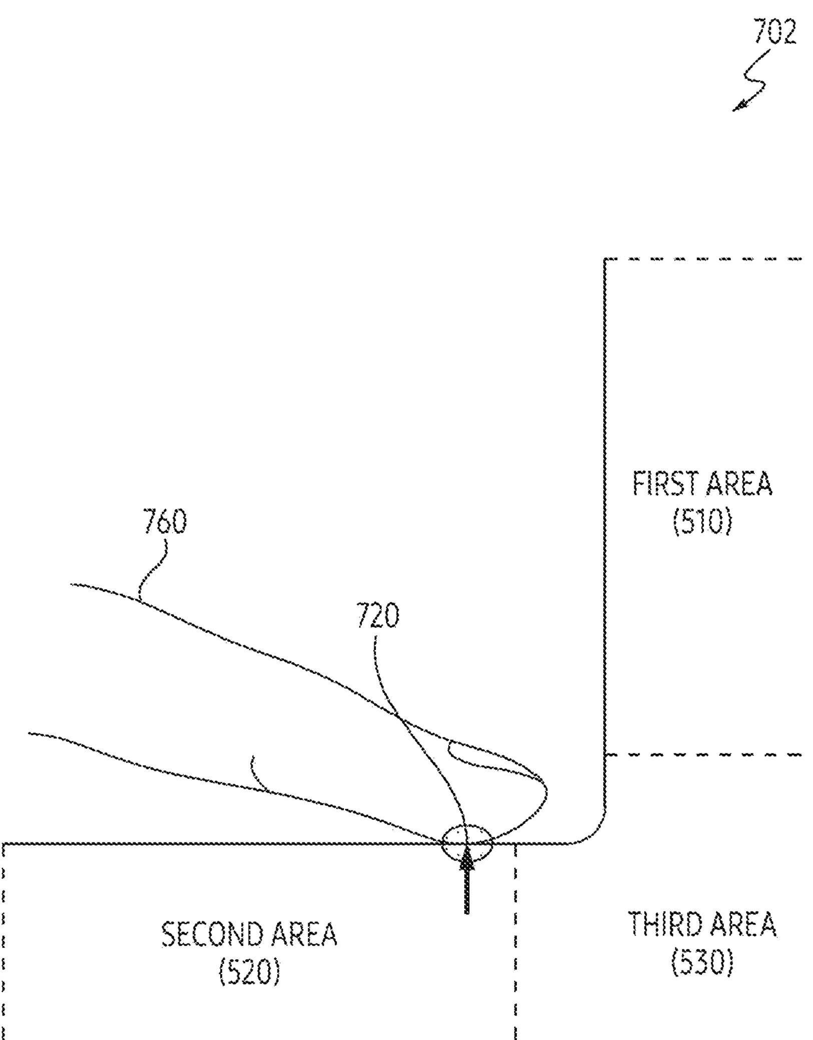

FIGS. 7A and 7B illustrate examples with respect to a method of identifying an input according to an area of a flexible display according to various embodiments of the disclosure.

An electronic device 101 of FIGS. 7A and 7B may be understood to be substantially the same as the electronic device 101 of FIG. 5. For example, a flexible display 160 of FIGS. 7A and 7B may be understood to be substantially the same as the flexible display 160 of FIG. 5. For example, a third area 530 may include a first partial area 531 corresponding to a first area 510 and a second partial area 532 corresponding to a second area 520 based on a folding axis 500.

FIGS. 7A and 7B illustrate examples 701 and 702 in which the electronic device 101 identifies a touch input based on an input with respect to a plurality of areas of the flexible display 160. The input may include at least one of an input including a contact point by an external object or a hovering input by the external object. For example, the touch input may indicate an input corresponding to a position that the electronic device 101 identifies as being inputted from an external (or an external object) based on the at least one input.

FIG. 7A illustrates an example 701 of the electronic device 101 identifying an input by an external object 760 with respect to the third area 530. Referring to FIG. 7A, FIG. 7A illustrates an example of the electronic device 101 in a state in which the flexible display 160 is folded at a right angle (90°). However, the embodiment of the disclosure is not limited thereto. For example, the embodiment of the disclosure may also be applied to an electronic device 101 in a state in which the flexible display 160 is folded at an angle greater than or less than a right angle.

Referring to the example 701, the electronic device 101 may identify a plurality of inputs by the external object 760 with respect to the third area 530. For example, the electronic device 101 may identify an input 711 including a contact point with respect to the second partial area 532 of the third area 530. For example, the electronic device 101 may identify a hovering input 712 with respect to the first partial area 531 of the third area 530.

Referring to an example 701*a* indicating an enlarged input state of the example 701, the electronic device 101 may identify the input 711 including the contact point with respect to the second partial area 532 of the third area 530. The electronic device 101 may identify the hovering input 712 with respect to the first partial area 531 of the third area 530. According to an embodiment, the hovering input 712 may correspond to a portion 765 in which a distance 715 between the external object 760 and the first partial area 531 is the shortest distance. For example, the hovering input 712 may indicate a change in a signal (e.g., voltage, quantity of light, resistance, or quantity of charge) with respect to nodes that are changed by the portion 765.

According to an embodiment, the electronic device 101 may identify a touch input based on the input 711 including the contact point and the hovering input 712. For example, the electronic device 101 may identify the touch input based on a position of the contact point of the input 711, and a ratio between the distance 715 and a reference distance. For example, the electronic device 101 may identify the touch input corresponding to a position 710 in which the position of the contact point of the input 711 is corrected based on the ratio between the reference distance, which is a maximum distance being capable of identifying the hovering input 712, and the distance 715. For example, as the distance 715 becomes shorter (e.g., in a case of approaching the first partial area 531, when the external object 760 has a contact point in the second partial area 532 and has a hovering input with respect to the first partial area 531), the position 710 may become closer to the folding axis 500.

Referring to the above, as the third area 530 is an area that is difficult to touch according to a folding state of the flexible display 160, the electronic device 101 may identify the position 710 on the third area 530 as the touch input based on the position of the input 711 including the contact point and a position of the hovering input 712.

FIG. 7B illustrates an example 702 of the electronic device 101 identifying an input by the external object 760 with respect to the second area 520. Referring to FIG. 7B, FIG. 7B illustrates an example of the electronic device 101 in a state in which the flexible display 160 is folded at a right angle (90°). However, the embodiment of the disclosure is not limited thereto. For example, the embodiment of the disclosure may also be applied to an electronic device 101 in a state in which the flexible display 160 is folded at an angle greater than or less than a right angle.

Referring to the example 702, the electronic device 101 may identify the input by the external object 760 with respect to the second area 520. For example, the electronic device 101 may identify an input 720 including a contact point with respect to the second area 520. According to an embodiment, the electronic device 101 may identify a position of the second area 520 corresponding to the input 720 including the contact point as the touch input. For example, the electronic device 101 may identify an input with respect to a position on the second area 520 that is substantially the same as a position of the contact point of the input 720 as the touch input.

According to an embodiment, a range in which the electronic device 101 may identify the position of the contact point of the input 720 and a position of the touch input as being the same on the second area 520 may be identified based on a reference distance, which is a maximum distance being capable of identifying a hovering input by the external object 760. For example, in a case where the electronic device 101 performs the input 720 in an area in which the hovering input is not identified by the external object 760 (e.g., in a case that the external object 760 performs the input 720 with respect to the second area 520 at a position higher than the reference distance), the position of the contact point and the position of the touch input of the second area 520 may be identified as the same. For example, the electronic device 101 may identify a position of an input including a contact point on the second area 520 by the external object 760 at the maximum distance being capable of identifying the hovering input (or a maximum hovering detection distance), to be the same as the position of the touch input.

Referring to the above, as the second area 520 is an area that is easy to touch regardless of a folding state of the flexible display 160, the electronic device 101 may identify the position on the second area 520 corresponding to the position of the input 720 including the contact point as the touch input.

In FIGS. 6A to 6C, 7A, and 7B, an example in which the electronic device 101 identifies a touch input with respect to a specific position has been described, but the embodiment of the disclosure is not limited thereto. According to an embodiment, the electronic device 101 may identify a touch input having a specific length in response to a drag input with respect to at least one area. The drag input may indicate an input that, after being in contact (after maintaining contact) with one point of the flexible display 160 for a certain period of time, moves to another point of the flexible display 160 while maintaining the contact state. For example, the electronic device 101 may identify, in response to an external object moving from the first area 510 toward the second area 520 across over the third area 530, a drag input with respect to a movement of the external object. Alternatively, the electronic device 101 may identify, in response to an external object moving from the second area 520 toward the first area 510 across over the third area 530, a drag input with respect to a movement of the external object.

For example, the electronic device 101 may identify a drag input with respect to a movement of an external object in response to the external object moving in the first area 510. For example, the electronic device 101 may identify (or recognize) a touch input having a first length based on a first set of contact points on the first area 510 according to the drag input. For example, the electronic device 101 may identify a drag input with respect to a movement of an external object in response to the external object moving in the second area 520. For example, the electronic device 101 may identify a touch input having a second length based on a second set of contact points on the second area 520 according to the drag input. Alternatively, the electronic device 101 may identify a drag input with respect to a movement of an external object in response to the external object moving in the third area 530. For example, the electronic device 101 may identify a touch input having a third length based on a third set of contact points and hovering inputs caused by the external object in the third area 530.

Figure 8A:
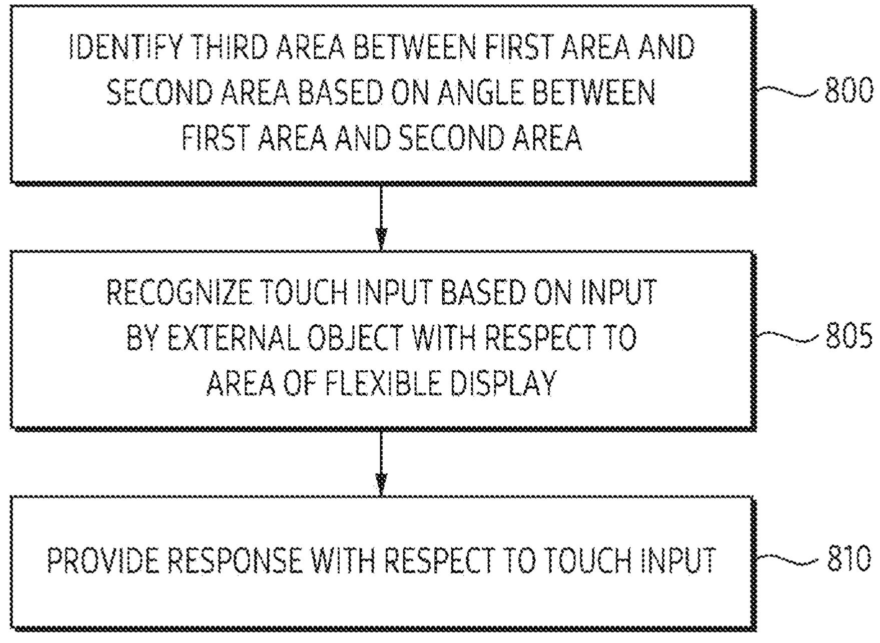
FIGS. 8A and 8B illustrate an example of a flowchart indicating an operation with respect to a method of identifying an input according to an area of a flexible display according to various embodiments of the disclosure.
Figure 8B:
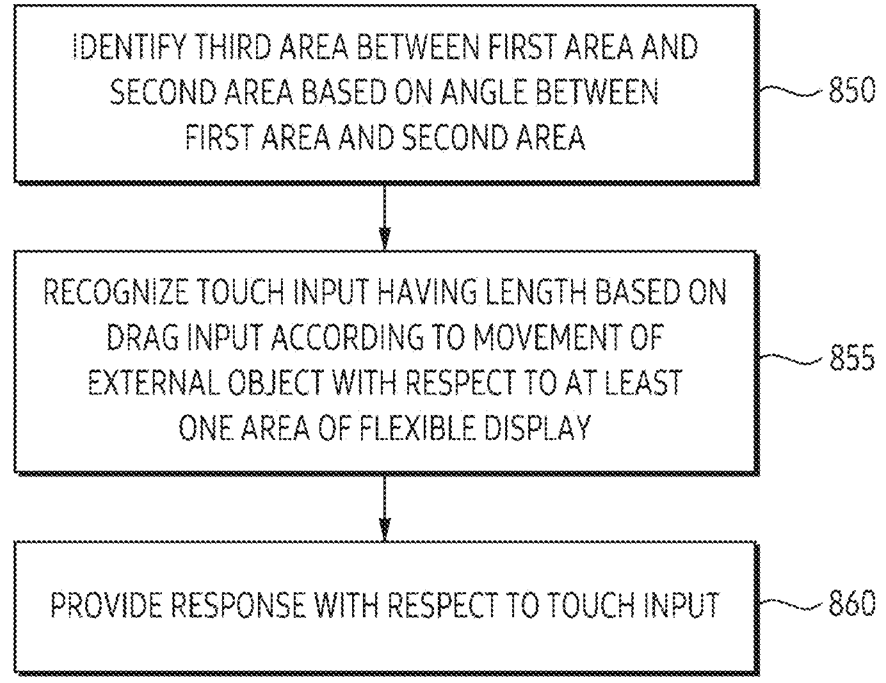

FIGS. 8A and 8B illustrate an example of a flowchart indicating an operation with respect to a method of identifying an input according to an area of a flexible display according to various embodiments of the disclosure.

FIGS. 8A and 8B may be performed by the electronic device 101 of FIG. 5. For example, a method of FIG. 8A and a method of FIG. 8B may be performed by a processor 120 of the electronic device 101.

A touch input of FIGS. 8A and 8B may indicate an input corresponding to a position that the electronic device 101 identifies as being inputted from an external (or an external object) based on at least one input with respect to a flexible display 160. In other words, the touch input in the disclosure may indicate an input that the electronic device 101 recognizes as being inputted with respect to the flexible display 160 based on at least one of an input including a contact point actually inputted by the external object, a hovering input, or a drag input.

FIG. 8A illustrates an example of a method of identifying a touch input for a specific position with respect to the folded flexible display 160 according to an embodiment. In operation 800, the processor 120 may identify a third area between a first area and a second area based on an angle between the first area and the second area. For example, the processor 120 may identify an angle between the first area (e.g., the first area 510 of FIG. 5) of the flexible display 160 corresponding to a first housing (e.g., the first housing 210 of FIGS. 2A and 2B) of the electronic device 101 and the second area (e.g., the second area 520 of FIG. 5) of the flexible display 160 corresponding to a second housing (e.g., the second housing 220 of FIGS. 2A and 2B) of the electronic device 101, based on at least one sensor (e.g., the sensor 176 of FIG. 1). For example, the angle may be referred to as a folding angle. For example, the processor 120 may identify the third area between the first area and the second area based on the angle. For example, the third area may be referred to as a touch difficulty area. The third area may include a first partial area (e.g., the first partial area 531 of FIG. 5) corresponding to the first area and a second partial area (e.g., the second partial area 532 of FIG. 5) corresponding to the second area based on a folding axis (e.g., the folding axis 500 of FIG. 5) of the electronic device 101 (or the flexible display 160). According to an embodiment, the third area may be changed based on folding radius (R) with respect to the folding axis of the electronic device 101, the folding angle, or a size of an external object touching the device. For example, the processor 120 may identify the third area based on the folding angle. For example, the processor 120 may identify the third area based on the folding angle, a distance indicating a height from the flexible display 160 to the hovering input on a condition that includes both an input including a contact point and a hovering input in the third area, and a reference distance indicating a maximum distance being capable of identifying the hovering input.

In operation 805, the processor 120 may recognize a touch input based on an input by the external object with respect to an area of the flexible display 160. For example, the processor 120 may identify the input with respect to the flexible display 160 based on the external object. The processor 120 may identify the touch input based on the input. The input may include at least one of an input including a contact point, a hovering input, or a drag input.

For example, in response to an input having a contact point on the first area, as in the example 601 of FIG. 6A, the processor 120 may recognize the input as a touch input with respect to a position on the first area corresponding to a position of the contact point of the external object.

For example, in response to an input having a contact point on the third area, as in the example 602 of FIG. 6B, the processor 120 may recognize the input as a touch input with respect to a position on the third area identified based on a position of the contact point of the external object and a position of a hovering input caused by the external object. In this case, a position of the touch input may differ from the position of the contact point on the third area. It is assumed that the input having the contact point by the external object is positioned in the first partial area of the third area, and the hovering input is positioned in the second partial area of the third area. For example, the position of the touch input may indicate a point changed from the position of the contact point based on a ratio between the reference distance, which is the maximum distance being capable of identifying the hovering input, from the surface of the second partial area, and a distance indicating a height from the second partial area to the hovering input. The distance indicating the height from the second partial area to the hovering input may indicate the shortest distance from the flexible display 160 to the external object.

For example, in response to an input having a contact point on the first partial area of the third area and a contact point on the second partial area of the third area, as in the example 603 of FIG. 6C, the processor 120 may recognize the input as a touch input with respect to a boundary between the first partial area and the second partial area. For example, the processor 120 may recognize the input as a touch input with respect to the boundary indicating the folding axis, based on an input having the contact point on the first partial area and an input having a contact point on the second partial area, by the external object.

For example, in response to an input having a contact point on the third area, as in the example 701 of FIG. 7A, the processor 120 may recognize the input as a touch input with respect to a position on the third area identified based on a position of the contact point of the external object and a position of a hovering input caused by the external object. In this case, a position of the touch input may differ from the position of the contact point on the third area. It is assumed that the input having the contact point by the external object is positioned in the second partial area of the third area, and the hovering input is positioned in the first partial area of the third area. For example, the position of the touch input may indicate a point changed from the position of the contact point based on a ratio between a reference distance, which is the maximum distance being capable of identifying the hovering input from the surface of the first partial area, and a distance indicating a height from the first partial area to the hovering input.

For example, in response to an input having a contact point on the second area, as in the example 702 of FIG. 7B, the processor 120 may recognize the input as a touch input with respect to a position on the second area corresponding to a position of the contact point of the external object.

According to an embodiment, the processor 120 may identify a value of a signal with respect to a plurality of nodes of the flexible display 160 in order to identify a contact point (or an input having a contact point) and a hovering input by an external object. For example, the processor 120 may identify a signal (e.g., voltage, quantity of light, resistance, or quantity of charge) with respect to each of the plurality of nodes included in the flexible display 160. For example, the processor 120 may identify a change in a value measured through the signal in response to the contact point or the hovering input by the external object. For example, in a case of the input having the contact point, the processor 120 may identify a first position with respect to the input having the contact point based on a first threshold value and a value with respect to each of first nodes corresponding to a contact with respect to an area of the flexible display 160 of the external object. For example, the processor 120 may identify the first position based on values greater than or equal to the first threshold value among the values with respect to each of the first nodes. The first nodes may be included in the plurality of nodes. The first threshold value may indicate a reference value for identifying an input having a contact point. Alternatively, the processor 120 may identify a second position with respect to a hovering input based on a second threshold value and a value with respect to each of second nodes corresponding to the hovering input with respect to an area of the flexible display 160 of the external object. For example, the processor 120 may identify the second position based on values equal to or greater than the second threshold value among values with respect to each of the second nodes. The second nodes may be included in the plurality of nodes. The second threshold value may be a reference value for identifying a hovering input, and may be a value less than the first threshold value.

In operation 810, the processor 120 may provide a response with respect to a touch input. For example, the processor 120 may perform a response with respect to the touch input with respect to a specific position recognized according to the operation 805. For example, the response may perform an operation with respect to a visual object corresponding to a position of the touch input. For example, the operation with respect to the visual object may include execution of a software application, displaying another visual object representing selection of the visual object, and the like. For example, the processor 120 may provide a response with respect to a touch input identified based on an input having a contact point by an external object. Alternatively, the processor 120 may provide a response with respect to a touch input identified based on an input having a contact point and a hovering input by an external object. Alternatively, the processor 120 may provide a response with respect to a touch input identified based on inputs having a contact point by an external object.

FIG. 8B illustrates an example of a method of identifying a touch input having a specific length in response to a drag input with respect to the folded flexible display 160 according to an embodiment. In operation 850, the processor 120 may identify a third area between a first area and a second area based on an angle between the first area and the second area. For example, the processor 120 may identify an angle between the first area (e.g., the first area 510 of FIG. 5) of the flexible display 160 corresponding to a first housing (e.g., the first housing 210 of FIGS. 2A and 2B) of the electronic device 101 and the second area (e.g., the second area 520 of FIG. 5) of the flexible display 160 corresponding to a second housing (e.g., the second housing 220 of FIGS. 2A and 2B) of the electronic device 101, based on at least one sensor (e.g., the sensor 176 of FIG. 1). For example, the angle may be referred to as a folding angle. For example, the processor 120 may identify the third area between the first area and the second area based on the angle. For example, the third area may be referred to as a touch difficulty area. The third area may include a first partial area (e.g., the first partial area 531 of FIG. 5) corresponding to the first area and a second partial area (e.g., the second partial area 532 of FIG. 5) corresponding to the second area based on a folding axis (e.g., the folding axis 500 of FIG. 5) of the electronic device 101 (or the flexible display 160). According to an embodiment, the third area may be changed based on folding radius (R) with respect to the folding axis of the electronic device 101, the folding angle, or a size of an external object touching the device. For example, the processor 120 may identify the third area based on the folding angle. For example, the processor 120 may identify the third area based on the folding angle, a distance indicating a height from the flexible display 160 to the hovering input on a condition that both an input including a contact point and a hovering input in the third area, and a reference distance indicating a maximum distance being capable of identifying the hovering input.

In operation 855, the processor 120 may recognize a touch input based on a drag input by an external object with respect to an area of the flexible display 160. For example, the drag input may indicate an input that, after being in contact (maintaining contact) with one point of the flexible display 160 for a certain period of time, moves to another point of the flexible display 160 while maintaining the contact state.

For example, the processor 120 may identify, in response to an external object moving from the first area toward the second area across over the third area, a drag input with respect to a movement of the external object. For example, the processor 120 may identify a first drag input on the first area and a second drag input on the third area. For example, the processor 120 may identify a touch input having a first length on the first area based on contact points on the first area according to the first drag input. For example, the processor 120 may identify a touch input having a second length on the third area based on contact points and hovering inputs on the third area according to the second drag input. In other words, the processor 120 may recognize the touch input having the first length and the touch input having the second length in response to the drag input (including the first drag input and the second drag input) according to the movement of the external object.

For example, in a case that the movement of the external object extends beyond (across over) the third area to the second area, the processor 120 may identify a touch input having a second length on the second area based on contact points on the second area according to a third drag input on the second area. In FIG. 8B, the movement of the external object starting from the first area is described as an example, but the movement may start from the second area. For example, the electronic device 101 may identify, in response to an external object moving from the second area toward the first area across over the third area, a drag input with respect to a movement of the external object.

For example, a method of identifying a touch input having a length, based on contact points (or inputs having a contact point) and hovering inputs caused by the drag input may be applied in substantially the same manner as the method of FIG. 8A. For example, in a case of the contact points and the hovering inputs on the third area according to the second drag input, the processor 120 may recognize a touch input with respect to a specific position based on one contact point among the contact points and one hovering input corresponding to the one contact point among the hovering inputs. The processor 120 may identify a touch input having a specific length by continuously recognizing a touch input with respect to a specific position with respect to the contact points and the hovering inputs. Therefore, the specific details will be omitted thereafter.

In operation 860, the processor 120 may provide a response with respect to a touch input. For example, the processor 120 may perform a response with respect to the touch input having a specific length recognized according to the operation 855. For example, the response may perform an operation with respect to a visual object corresponding to a position of the touch input. For example, the operation with respect to the visual object may include execution of a software application, displaying another visual object representing selection of at least one visual object including the visual object, and/or movement of the visual object.

Figure 9A:
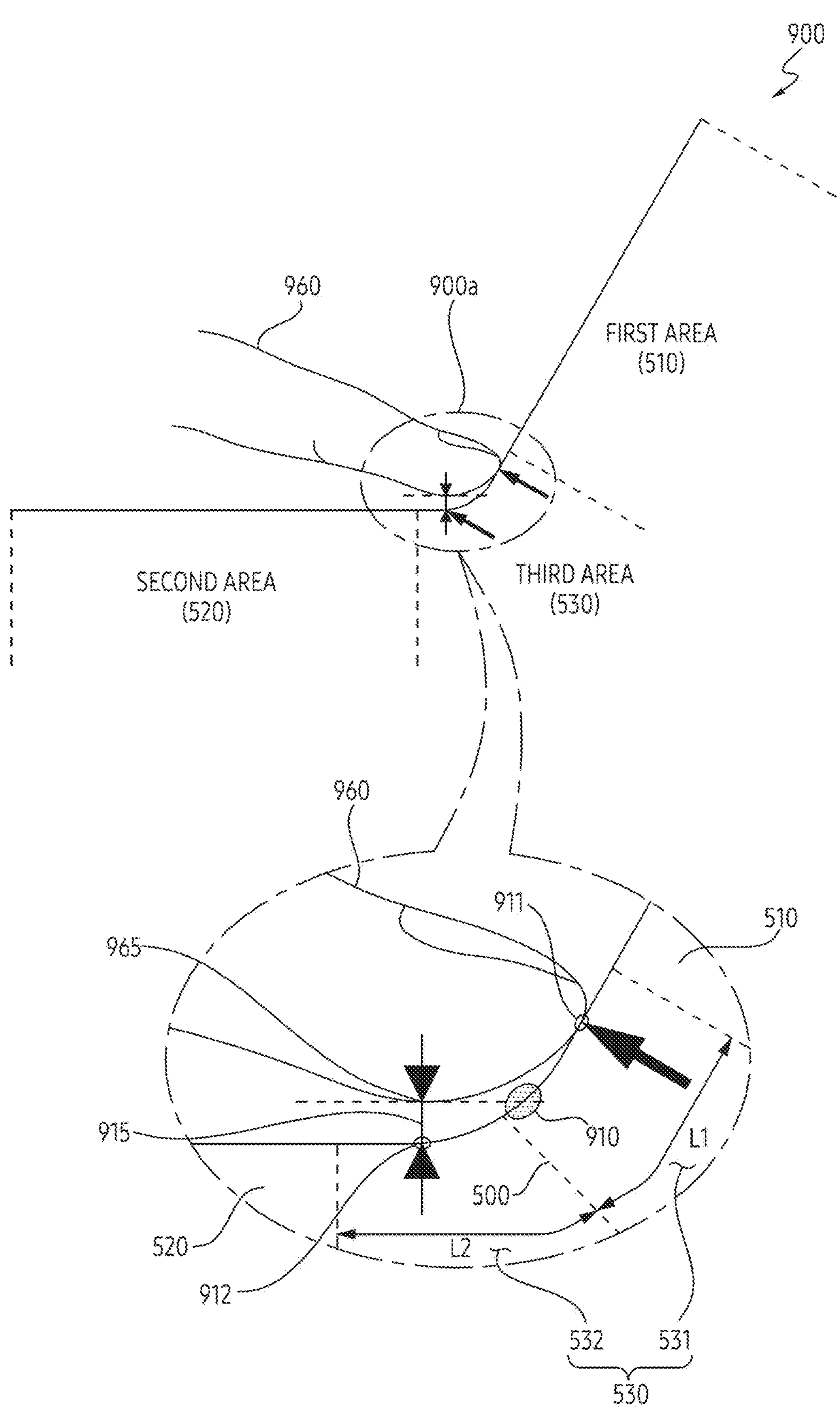
FIG. 9A illustrates an example with respect to a method of identifying an input according to an area of a flexible display of an electronic device folded at an angle different from a right angle according to an embodiment of the disclosure.

FIG. 9A illustrates an example with respect to a method of identifying an input according to an area of a flexible display of an electronic device folded at an angle different from a right angle according to an embodiment of the disclosure.

Figure 9B:
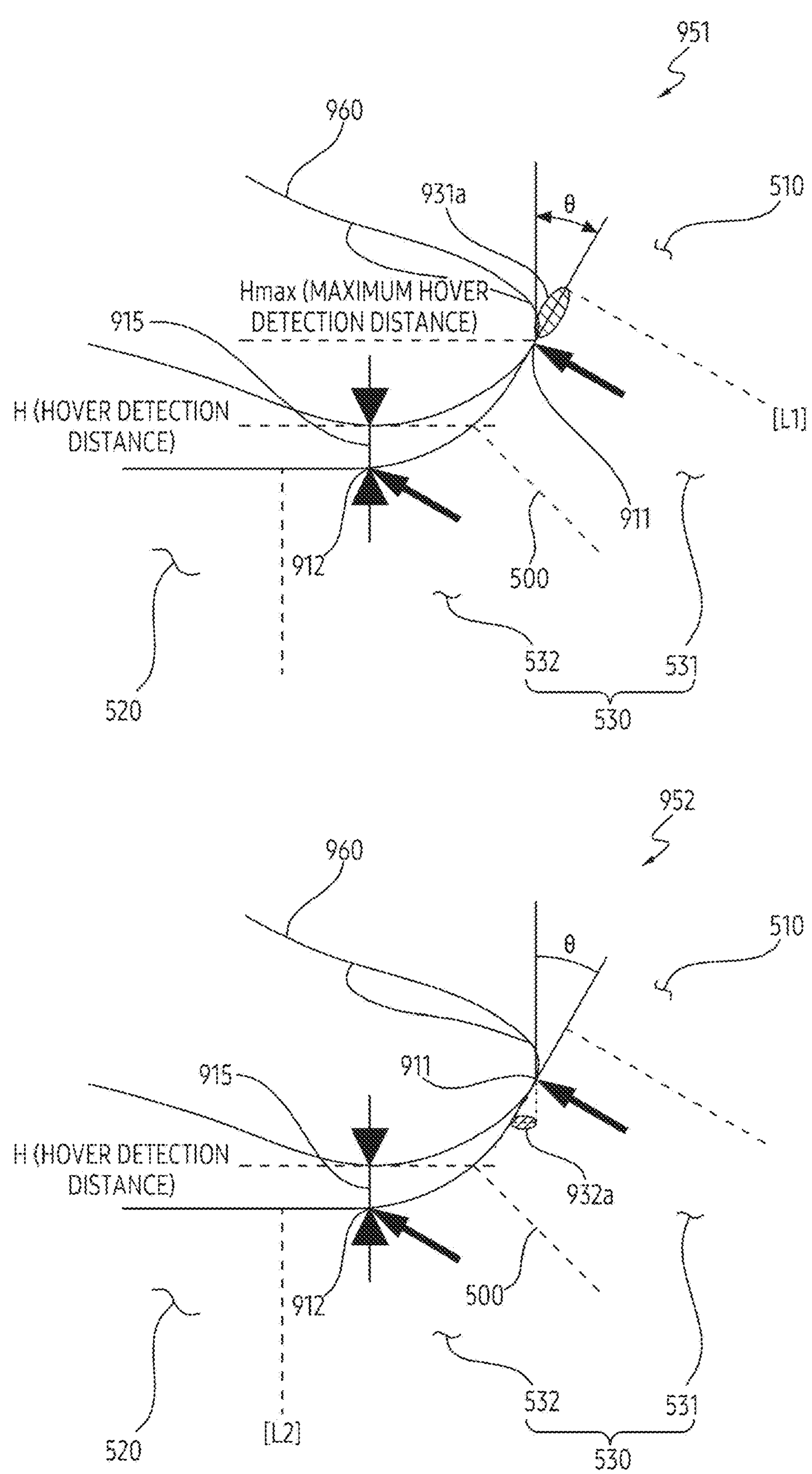
FIG. 9B illustrates examples with respect to a method of identifying an area of a flexible display of an electronic device folded at an angle different from a right angle according to an embodiment of the disclosure.

Referring to FIGS. 9A and 9B, it is assumed that folding radius (R) of an electronic device 101 and a size of an external object 960 are maintained, and an example is described in which a third area 530 is changed according to a folding angle of the electronic device 101. However, an embodiment of the disclosure is not limited thereto, and the third area 530 may also be changed by the folding R and the size of the external object 960.

An electronic device 101 of FIG. 9A may be understood to be substantially the same as the electronic device 101 of FIG. 5. For example, a flexible display 160 of FIG. 9A may be understood to be substantially the same as the flexible display 160 of FIG. 5. For example, the third area 530 may include a first partial area 531 corresponding to a first area 510 and a second partial area 532 corresponding to a second area 520 based on a folding axis 500. FIG. 9A describes the electronic device 101 including the flexible display 160 folded at an angle different from a right angle, as an example, unlike the electronic device 101 in FIGS. 6A to 6C, 7A, and 7B, in which the flexible display 160 is folded at a right angle.

FIG. 9A illustrates an example 900 of identifying a touch input based on an input with respect to a plurality of areas of the flexible display 160 having a folding angle greater than 90°. The input may include at least one of an input including a contact point by an external object or a hovering input by the external object. For example, the touch input may indicate an input corresponding to a position that the electronic device 101 identifies as being inputted from an external (or an external object) based on the at least one input.

Referring to the example 900, the electronic device 101 may identify a plurality of inputs by the external object 960 with respect to the third area 530. For example, the electronic device 101 may identify an input 911 including a contact point with respect to the first partial area 531 of the third area 530. For example, the electronic device 101 may identify a hovering input 912 with respect to the second partial area 532 of the third area 530.

Referring to an example **900*a* indicating an enlarged input state of the example 900, the electronic device 101 may identify the input 911 including the contact point with respect to the first partial area 531 of the third area 530. The electronic device 101 may identify the hovering input 912 with respect to the second partial area 532 of the third area 530. According to an embodiment, the hovering input 912 may correspond to a portion 965 in which a distance 915 between the external object 960 and the second partial area 532 is the shortest distance. For example, the hovering input 912 may indicate a change in a signal (e.g., voltage, quantity of light, resistance, or quantity of charge) with respect to nodes that are changed by the portion 965**.

According to an embodiment, the electronic device 101 may identify a touch input based on the input 911 including the contact point and the hovering input 912. For example, the electronic device 101 may identify the touch input based on a position of the contact point of the input 911, and a ratio between the distance 915 and a reference distance. For example, the electronic device 101 may identify the touch input corresponding to a position 910 in which the position of the contact point of the input 911 is corrected based on the ratio between the reference distance, which is a maximum distance being capable of identifying the hovering input 912, and the distance 915. For example, as the distance 915 becomes shorter (e.g., in a case of approaching the second partial area 532, when the external object 960 has a contact point in the first partial area 531 and has a hovering input with respect to the second partial area 532), the position 910 may become closer to the folding axis 500.

Referring to the above, as the third area 530 is an area that is difficult to touch according to a folding state of the flexible display 160, the electronic device 101 may identify the position 910 on the third area 530 as the touch input based on the position of the input 911 including the contact point and the hovering input 912.

Referring to FIG. 9A, according to an embodiment, the electronic device 101 may set a touch difficulty area (e.g., the third area 530) based on a folding angle of the flexible display 160. For example, the first partial area 531 and the second partial area 532 may be changed based on the folding angle. Related details are described below in FIG. 9B.

FIG. 9B illustrates examples with respect to a method of identifying an area of a flexible display of an electronic device folded at an angle different from a right angle according to an embodiment of the disclosure.

An electronic device 101 of FIG. 9B may be understood to be substantially the same as the electronic device 101 of FIG. 5. For example, a flexible display 160 of FIG. 9B may be understood to be substantially the same as the flexible display 160 of FIG. 5. For example, the third area 530 may include the first partial area 531 corresponding to the first area 510 and the second partial area 532 corresponding to the second area 520 based on a folding axis 500.

Referring to FIG. 9B, in the flexible display 160 having a folding angle greater than 90°, examples 951 and 952 for identifying a touch difficulty area (e.g., the third area 530) according to the folding angle are illustrated. The example 951 may indicate an example of identifying the first partial area 531. The example 952 may indicate an example of identifying the second partial area 532. For convenience of explanation, the example 951 and the example 952 assume that a side surface of the electronic device 101 is positioned on an xy-plane and that a point in which the folding axis 500 and the flexible display 160 meet is an origin.

Referring to the example 951, the electronic device 101 may identify a plurality of inputs with respect to the third area 530. For example, the electronic device 101 may identify an input 911 including a contact point by the external object 960 in the first partial area 531 and a hovering input 912 by the external object 960 in the second partial area 532. According to an embodiment, the electronic device 101 may identify the first partial area 531 based on a folding angle of the flexible display 160 and the input 911. For example, the folding angle may be 90°+θ. For example, the electronic device 101 may identify coordinates on the flexible display 160 corresponding to a position of the input 911. For example, the coordinates of the input 911 may be (x1, y1). The electronic device 101 may identify a distance spaced apart from the folding axis 500 based on the identified coordinates with respect to the input 911. The electronic device 101 may identify the first partial area 531 based on the spaced-apart distance and the folding angle. The equation for identifying the first partial area 531 is as follows.

$$L1 = l(y1) + \frac{H\max - H}{\cos\theta} \qquad \text{Equation 1}$$

The L1 may indicate a distance from a point (e.g., the origin (0, 0)) in which the folding axis 500 and the flexible display 160 meet in the xy-plane to a boundary between the first partial area 531 and the first area 510, the l(y1) may indicate a distance from the origin to the input 911, the Hmax may indicate a maximum distance (or a reference distance or a maximum hover detection distance) at which a hovering input may be detected from the surface of the flexible display 160, the H may indicate a distance (or a hover detection distance) from the surface of the flexible display 160 to the hovering input, and the θ may indicate a folding angle. In this case, the input 911 may indicate an input with respect to the flexible display 160 in which the hovering input 912 exists together by the external object 960 related to the input 911. In addition, the l in the equation is described as a distance in a two-dimensional plane, but the embodiment of the disclosure is not limited thereto. For example, the l may indicate a distance in a three-dimensional space from a specific point of the flexible display 160, as a reference point, to an input which is identified based on coordinates of the input (e.g., the input 911 or the hovering input 912) and the curvature of the flexible display 160.

Referring to the above, the first partial area 531 may be identified based on the folding angle of the flexible display 160, the coordinates indicating the position of the input 911, the hovering input 912 of the external object 960 related to the input 911, and a reference distance capable of identifying the hovering input 912. For example, the first partial area 531 may include an area changed by a distance 931*a* identified based on the folding angle with respect to the distance from the origin on the folding axis 500 to the input 911. For example, the electronic device 101 may identify a touch input of a position 910, which is moved from the input 911, based on a ratio between the distance to the hovering input 912 and the reference distance in the changed first partial area 531.

Referring to the example 952, the electronic device 101 may identify the plurality of inputs with respect to the third area 530. For example, the electronic device 101 may identify an input 911 including a contact point by the external object 960 in the first partial area 531 and a hovering input 912 by the external object 960 in the second partial area 532. According to an embodiment, the electronic device 101 may identify the first partial area 531 based on a folding angle of the flexible display 160 and the input 911. For example, the folding angle may be 90°+e. For example, the electronic device 101 may identify coordinate on the flexible display 160 corresponding to a position of the hovering input 912. For example, the coordinates of the hovering input 912 may be (x2, y2). The electronic device 101 may identify a distance spaced apart from the folding axis 500 based on the identified coordinates with respect to the hovering input 912. The electronic device 101 may identify the first partial area 531 based on the spaced-apart distance and the folding angle. The equation for identifying the first partial area 531 is as follows.

$$L2 = l(y2) + H\tan\theta + H\max \qquad \text{Equation 2}$$

The L2 may indicate a distance from the point (e.g., the origin (0, 0)) in which the folding axis 500 and the flexible display 160 meet in the xy-plane to a boundary between the second partial area 532 and the second area 520, the l(y2) may indicate a distance from the origin to the hovering input 912, the Hmax may indicate a maximum distance (or a reference distance or a maximum hover detection distance) at which a hovering input may be detected from the surface of the flexible display 160, the H may indicate a distance (or a hover detection distance) from the surface of the flexible display 160 to the hovering input, and the θ may indicate a folding angle. In this case, the hovering input 912 may indicate an input with respect to the flexible display 160 in which the input 911 including a contact point exists together by the external object 960 related to the hovering input 912. In addition, the l in the equation is described as a distance in a two-dimensional plane, but the embodiment of the disclosure is not limited thereto. For example, the l may indicate a distance in a three-dimensional space from a specific point of the flexible display 160, as a reference point, to an input which is identified based on coordinates of the input (e.g., the input 911 or the hovering input 912) and the curvature of the flexible display 160.

Referring to the above, the second partial area 532 may be identified based on the folding angle of the flexible display 160, the coordinates indicating the position of the hovering input 912, the distance indicating a height of the hovering input 912, and a reference distance capable of identifying the hovering input 912. For example, the first partial area 531 may include an area changed by a distance 932*a* identified based on the folding angle with respect to the distance from the origin on the folding axis 500 to the hovering input 912.

Referring to FIGS. 1, 2A, 2B, 3A, 3B, 4, 5, 6A to 6C, 7A, 7B, 8A, 8B, 9A, and 9B, a device and a method according to an embodiment of the disclosure may identify (or recognize) an input with respect to the touch difficulty area based on an input including a contact point and a hovering input by an external object. The device and the method according to an embodiment of the disclosure may accurately identify an input with respect to a variable touch difficulty area according to a folding angle. In addition, even in a case of a drag input including the touch difficulty area, the device and the method according to an embodiment of the disclosure may accurately identify the drag input including the variable touch difficulty area according to the folding angle.

Figure 10:
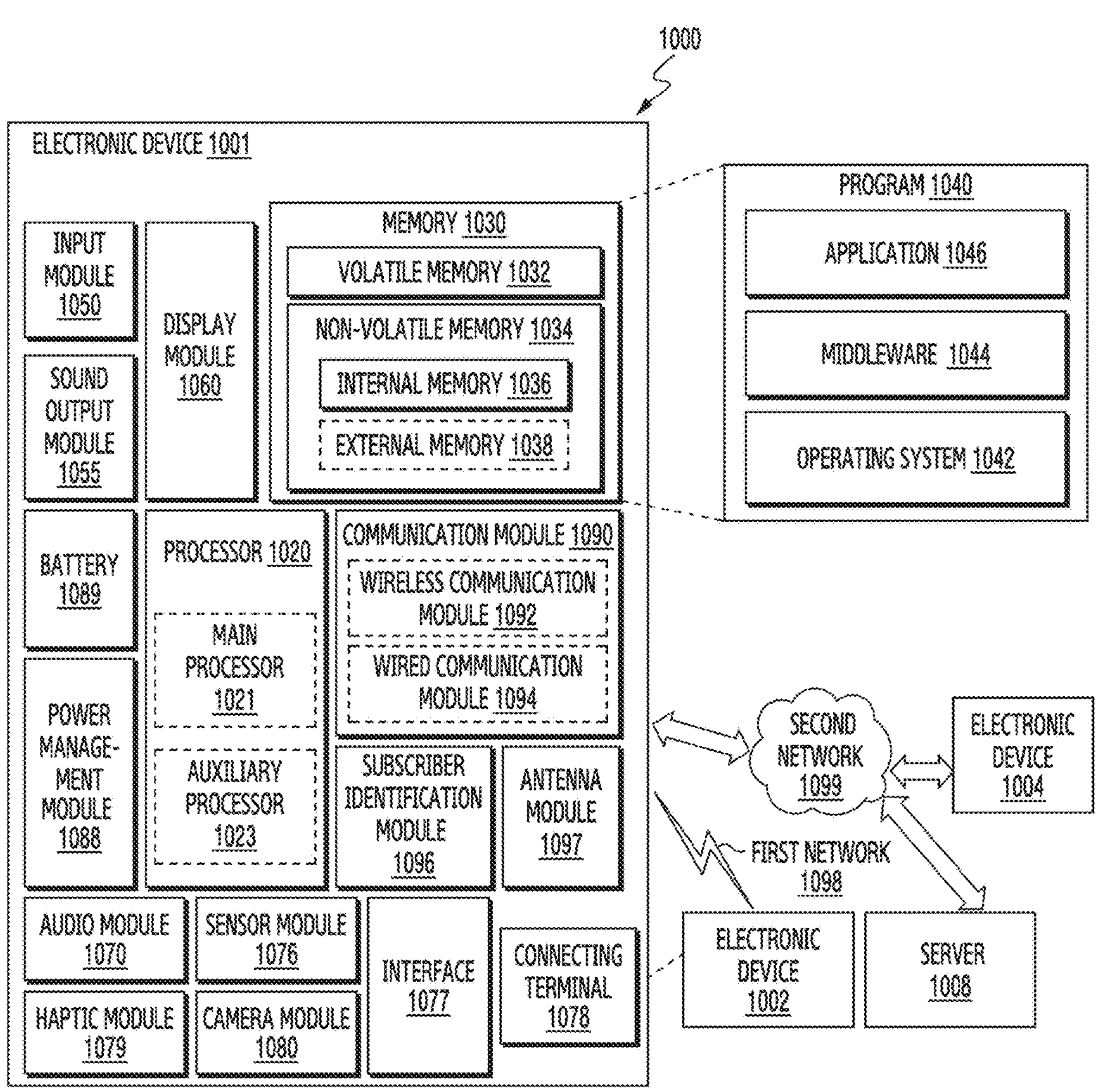
FIG. 10 is a block diagram of an electronic device in a network environment according to an embodiment of the disclosure.

FIG. 10 is a block diagram illustrating an electronic device 1001 in a network environment 1000 according to an embodiment of the disclosure.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, an HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the millimeter wave (mm Wave) band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 1064 dB or less) for implementing mMTC, or U-plane latency (e.g., 0.5 ms or less for each of downlink (DL) and uplink (UL), or a round trip of 10 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002 or 1004, or the server 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

As described above, an electronic device 101 may comprise a first housing 210. The electronic device 101 may comprise a second housing 220. The electronic device 101 may comprise a hinge structure 265 rotatably coupling the second housing 220 to the first housing 210. The electronic device 101 may comprise a flexible display 160 disposed on a surface of the first housing 210 and a surface of the second housing 220 across the hinge structure 265. The flexible display 160 may include a first area corresponding to the first housing 210, a second area corresponding to the second housing 220, and a third area between the first area and the second area. The electronic device 101 may comprise memory 130 storing instructions. The electronic device 101 may comprise at least one sensor 176. The electronic device 101 may comprise a processor 120. The instructions, when executed by the processor 120, may cause the electronic device 101 to identify an input with respect to the flexible display 160 based on an external object. The instructions, when executed by the processor 120, may cause the electronic device 101 to recognize the input, in response to the input having a first contact point on the first area, as a touch input with respect to a first position on the first area corresponding to a position of the first contact point. The instructions, when executed by the processor 120, may cause the electronic device 101 to recognize the input, in response to the input having a second contact point on the third area, as a touch input with respect to a second position on the third area identified based on a position of the second contact point of the external object and a position of a hovering input caused by the external object. The instructions, when executed by the processor 120, may cause the electronic device 101 to provide a response with respect to the touch input.

According to an embodiment, the instructions, when executed by the processor 120, may cause the electronic device 101 to identify an angle between the first area and the second area based on the at least one sensor 176. The instructions, when executed by the processor 120, may cause the electronic device 101 to identify a first partial area of the third area corresponding to the first area and a second partial area of the third area corresponding to the second area based on the angle and a reference distance for identifying the hovering input.

According to an embodiment, the instructions, when executed by the processor 120, may cause the electronic device 101 to identify a distance from the flexible display 160 of the second partial area to the external object in a case that the second contact point is positioned on the first partial area and the position of the hovering input of the external object is positioned on the second partial area. The instructions, when executed by the processor 120, may cause the electronic device 101 to identify the second position on the first partial area based on a ratio between the distance and the reference distance.

According to an embodiment, the reference distance may be a maximum distance being capable of identifying the hovering input. The distance may be shorter than the reference distance and may be the shortest distance from the flexible display 160 of the second area to the external object.

According to an embodiment, the instructions, when executed by the processor 120, may cause the electronic device 101 to identify a distance from the flexible display 160 of the first partial area to the external object in a case that the second contact point is positioned on the second partial area and the position of the hovering input of the external object is positioned on the first partial area. The instructions, when executed by the processor 120, may cause the electronic device 101 to identify the second position on the second partial area based on a ratio between the distance and the reference distance.

According to an embodiment, the instructions, when executed by the processor 120, may cause the electronic device 101 to recognize the input, in response to the input having a third contact point on the first partial area and having a fourth contact point on the second partial area, as a touch input with respect to a boundary between the first partial area and the second partial area.

According to an embodiment, the first position may be identified based on a first threshold value and first nodes corresponding to a contact with respect to the first area of the external object. The second position may be identified based on a first partial position and a second partial position. The first partial position may be identified based on the first threshold value and second nodes corresponding to a contact with respect to the third area of the external object. The second partial position may be identified based on a second threshold value less than the first threshold value and third nodes corresponding to a position of the hovering input with respect to the third area of the external object.

As described above, a method performed by an electronic device 101 may comprise identifying an input with respect to a flexible display 160 of the electronic device 101 based on an external object. The method may comprise recognizing the input, in response to the input having a first contact point on a first area of the flexible display 160 corresponding to a first housing 210, as a touch input with respect to a first position on the first area corresponding to a position of the first contact point. The method may comprise recognizing the input, in response to the input having a second contact point on a third area between the first area and a second area of the flexible display 160 corresponding to a second housing 220, as a touch input with respect to a second position on the third area identified based on a position of the second contact point of the external object and a position of a hovering input caused by the external object. The method may comprise providing a response with respect to the touch input. The flexible display 160 may include a hinge structure 265 rotatably coupling the second housing 220 to the first housing 210.

According to an embodiment, the method may comprise identifying an angle between the first area and the second area based on the at least one sensor 176. The method may comprise identifying a first partial area of the third area corresponding to the first area and a second partial area of the third area corresponding to the second area based on the angle and a reference distance for identifying the hovering input.

According to an embodiment, the method may comprise identifying a distance from the flexible display 160 of the second partial area to the external object in a case that the second contact point is positioned on the first partial area and the position of the hovering input of the external object is positioned on the second partial area. The method may comprise identifying the second position on the first partial area based on a ratio between the distance and the reference distance.

According to an embodiment, the reference distance may be a maximum distance being capable of identifying the hovering input. The distance may be shorter than the reference distance and may be the shortest distance from the flexible display 160 of the second area to the external object.

According to an embodiment, the method may comprise identifying a distance from the flexible display 160 of the first partial area to the external object in a case that the second contact point is positioned on the second partial area and the position of the hovering input of the external object is positioned on the first partial area. The method may comprise identifying the second position on the second partial area based on a ratio between the distance and the reference distance.

According to an embodiment, the method may comprise recognizing the input, in response to the input having a third contact point on the first partial area and having a fourth contact point on the second partial area, as a touch input with respect to a boundary between the first partial area and the second partial area.

According to an embodiment, the first position may be identified based on a first threshold value and first nodes corresponding to a contact with respect to the first area of the external object. The second position may be identified based on a first partial position and a second partial position. The first partial position may be identified based on the first threshold value and second nodes corresponding to a contact with respect to the third area of the external object. The second partial position may be identified based on a second threshold value less than the first threshold value and third nodes corresponding to a position of the hovering input with respect to the third area of the external object.

As described above, an electronic device 101 may comprise a first housing 210. The electronic device 101 may comprise a second housing 220. The electronic device 101 may comprise a hinge structure 265 rotatably coupling the second housing 220 to the first housing 210. The electronic device 101 may comprise a flexible display 160 disposed on a surface of the first housing 210 and a surface of the second housing 220 across the hinge structure 265. The flexible display 160 may include a first area corresponding to the first housing 210, a second area corresponding to the second housing 220, and a third area between the first area and the second area. The electronic device 101 may comprise memory 130 storing instructions. The electronic device 101 may comprise at least one sensor 176. The electronic device 101 may comprise a processor 120. The instructions, when executed by the processor 120, may cause the electronic device 101 to identify the third area based on an angle between the first area and the second area. The instructions, when executed by the processor 120, may cause the electronic device 101 to, in response to an external object moving from the first area toward the second area across over the third area, identify a movement of the external object on the first area as a first drag input and identify a movement of the external object on the third area as a second drag input. The instructions, when executed by the processor 120, may cause the electronic device 101 to recognize a touch input having a first length on the first area based on a first set of contact points on the first area according to the first drag input. The instructions, when executed by the processor 120, may cause the electronic device 101 to recognize a touch input having a second length on the third area based on a second set of contact points on the third area according to the second drag input and hovering inputs caused by the external object on the third area. The instructions, when executed by the processor 120, may cause the electronic device 101 to provide a response with respect to the touch input having the first length and the touch input having the second length.

According to an embodiment, the instructions, when executed by the processor 120, may cause the electronic device 101 to identify the angle between the first area and the second area based on the at least one sensor 176. The instructions, when executed by the processor 120, may cause the electronic device 101 to identify a first partial area of the third area corresponding to the first area and a second partial area of the third area corresponding to the second area based on the angle and a reference distance for identifying a hovering input.

According to an embodiment, the instructions, when executed by the processor 120, may cause the electronic device 101 to identify, for each of the hovering inputs, a distance from the flexible display 160 of the second partial area to the external object in a case that the second set of contact points according to the second drag input is positioned on the first partial area and the hovering inputs caused by the external object are positioned on the second partial area. The instructions, when executed by the processor 120, may cause the electronic device 101 to identify the second length based on a ratio between the distance and the reference distance.

According to an embodiment, the reference distance may be a maximum distance being capable of identifying the hovering input. The distance may be shorter than the reference distance and may be the shortest distance from the flexible display 160 of the second area to the external object.

According to an embodiment, the instructions, when executed by the processor 120, may cause the electronic device 101 to recognize the input, in response to the second drag input including an input having a contact point on the first partial area and having a contact point on the second partial area, as a touch input with respect to a boundary between the first partial area and the second partial area.

According to an embodiment, the instructions, when executed by the processor 120, may cause the electronic device 101 to identify a movement of the external object on the second area extending from the third area as a third drag input. The instructions, when executed by the processor 120, may cause the electronic device 101 to recognize a touch input having a third length on the second area based on a third set of contact points on the second area according to the third drag input. The instructions, when executed by the processor 120, may cause the electronic device 101 to provide the response based on the touch input having the first length, the touch input having the second length, and the touch input having the third length.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing;

a hinge structure rotatably coupling the second housing to the first housing;

a flexible display disposed on a surface of the first housing and a surface of the second housing across the hinge structure, wherein the flexible display includes:

a first area corresponding to the first housing, a second area corresponding to the second housing, and a third area between the first area and the second area;

memory, comprising one or more storage media, storing instructions;

at least one sensor; and one or more processors communicatively coupled to the flexible display, the memory, and the at least one sensor, wherein the instructions, when executed by the one or more processors individually or collectively, cause the electronic device to:

identify an input with respect to the flexible display based on an external object, in response to the input having a first contact point on the first area, recognize the input as a touch input with respect to a first position on the first area corresponding to a position of the first contact point, in response to the input having a second contact point on the third area, recognize the input as a touch input with respect to a second position on the third area identified based on a position of the second contact point and a position of a hovering input caused by the external object, and provide a response with respect to the touch input.

2. The electronic device of claim 1, wherein the instructions, when executed by the one or more processors individually or collectively, further cause the electronic device to:

identify an angle between the first area and the second area based on the at least one sensor, and based on the angle and a reference distance for identifying the hovering input, identify a first partial area of the third area corresponding to the first area and a second partial area of the third area corresponding to the second area.

3. The electronic device of claim 2, wherein the instructions, when executed by the one or more processors individually or collectively, further cause the electronic device to:

in response to the second contact point being positioned on the first partial area and the position of the hovering input of the external object being positioned on the second partial area, identify a distance from the flexible display of the second partial area to the external object, and based on a ratio between the distance and the reference distance, identify the second position on the first partial area.

4. The electronic device of claim 3, wherein the reference distance is a maximum distance being capable of identifying the hovering input, and wherein the distance is shorter than the reference distance and is a shortest distance from the flexible display of the second area to the external object.

5. The electronic device of claim 2, wherein the instructions, when executed by the one or more processors individually or collectively, further cause the electronic device to:

in response to the second contact point being positioned on the second partial area and the position of the hovering input of the external object being positioned on the first partial area, identify a distance from the flexible display of the first partial area to the external object, and based on a ratio between the distance and the reference distance, identify the second position on the second partial area.

6. The electronic device of claim 2, wherein the instructions, when executed by the one or more processors individually or collectively, further cause the electronic device to:

in response to the input having a third contact point on the first partial area and having a fourth contact point on the second partial area, recognize the input as a touch input with respect to a boundary between the first partial area and the second partial area.

7. The electronic device of claim 1, wherein the first position is identified based on a first threshold value and first nodes corresponding to a contact with respect to the first area of the external object, wherein the second position is identified based on a first partial position and a second partial position, wherein the first partial position is identified based on the first threshold value and second nodes corresponding to a contact with respect to the third area of the external object, and wherein the second partial position is identified based on a second threshold value less than the first threshold value and third nodes corresponding to a position of the hovering input with respect to the third area of the external object.

8. A method performed by an electronic device, the method comprising:

identifying, by the electronic device, an input with respect to a flexible display of the electronic device based on an external object;

in response to the input having a first contact point on a first area of the flexible display corresponding to a first housing, recognizing, by the electronic device, the input as a touch input with respect to a first position on the first area corresponding to a position of the first contact point;

in response to the input having a second contact point on a third area between the first area and a second area of the flexible display corresponding to a second housing, recognizing, by the electronic device, the input as a touch input with respect to a second position on the third area identified based on a position of the second contact point of the external object and a position of a hovering input caused by the external object; and providing, by the electronic device, a response with respect to the touch input, wherein the flexible display includes a hinge structure rotatably coupling the second housing to the first housing.

9. The method of claim 8, further comprising:

identifying an angle between the first area and the second area based on at least one sensor of the electronic device; and based on the angle and a reference distance for identifying the hovering input, identifying a first partial area of the third area corresponding to the first area and a second partial area of the third area corresponding to the second area.

10. The method of claim 9, further comprising:

in response to the second contact point being positioned on the first partial area and the position of the hovering input of the external object being positioned on the second partial area, identifying a distance from the flexible display of the second partial area to the external object; and based on a ratio between the distance and the reference distance, identifying the second position on the first partial area.

11. The method of claim 10, wherein the reference distance is a maximum distance being capable of identifying the hovering input, and wherein the distance is shorter than the reference distance and is a shortest distance from the flexible display of the second area to the external object.

12. The method of claim 9, further comprising:

in response to the second contact point being positioned on the second partial area and the position of the hovering input of the external object being positioned on the first partial area, identifying a distance from the flexible display of the first partial area to the external object; and based on a ratio between the distance and the reference distance, identifying the second position on the second partial area.

13. The method of claim 9, further comprising:

in response to the input having a third contact point on the first partial area and having a fourth contact point on the second partial area, recognizing the input as a touch input with respect to a boundary between the first partial area and the second partial area.

14. The method of claim 9, wherein the first position is identified based on a first threshold value and first nodes corresponding to a contact with respect to the first area of the external object, wherein the second position is identified based on a first partial position and a second partial position, wherein the first partial position is identified based on the first threshold value and second nodes corresponding to a contact with respect to the third area of the external object, and wherein the second partial position is identified based on a second threshold value less than the first threshold value and third nodes corresponding to a position of the hovering input with respect to the third area of the external object.

15. One or more non-transitory computer-readable storage media storing one or more computer programs including computer-executable instructions that, when executed by one or more processors of an electronic device individually or collectively, cause the electronic device to perform operations, the operations comprising:

identifying, by the electronic device, an input with respect to a flexible display of the electronic device based on an external object;

in response to the input having a first contact point on a first area of the flexible display corresponding to a first housing, recognizing, by the electronic device, the input as a touch input with respect to a first position on the first area corresponding to a position of the first contact point;

in response to the input having a second contact point on a third area between the first area and a second area of the flexible display corresponding to a second housing, recognizing, by the electronic device, the input as a touch input with respect to a second position on the third area identified based on a position of the second contact point of the external object and a position of a hovering input caused by the external object; and providing, by the electronic device, a response with respect to the touch input, wherein the flexible display includes a hinge structure rotatably coupling the second housing to the first housing.

16. The one or more non-transitory computer-readable storage media of claim 15, the operations further comprising:

identifying an angle between the first area and the second area based on at least one sensor of the electronic device; and based on the angle and a reference distance for identifying the hovering input, identifying a first partial area of the third area corresponding to the first area and a second partial area of the third area corresponding to the second area.

17. The one or more non-transitory computer-readable storage media of claim 16, the operations further comprising:

in response to the second contact point being positioned on the first partial area and the position of the hovering input of the external object being positioned on the second partial area, identifying a distance from the flexible display of the second partial area to the external object; and based on a ratio between the distance and the reference distance, identifying the second position on the first partial area.

18. The one or more non-transitory computer-readable storage media of claim 17, wherein the reference distance is a maximum distance being capable of identifying the hovering input, and wherein the distance is shorter than the reference distance and is a shortest distance from the flexible display of the second area to the external object.

19. The one or more non-transitory computer-readable storage media of claim 16, the operations further comprising:

in response to the second contact point being positioned on the second partial area and the position of the hovering input of the external object being positioned on the first partial area, identifying a distance from the flexible display of the first partial area to the external object; and based on a ratio between the distance and the reference distance, identifying the second position on the second partial area.

20. The one or more non-transitory computer-readable storage media of claim 16, the operations further comprising:

in response to the input having a third contact point on the first partial area and having a fourth contact point on the second partial area, recognizing the input as a touch input with respect to a boundary between the first partial area and the second partial area.

* * * * *